US008194276B2

(12) United States Patent
Natori

(10) Patent No.: US 8,194,276 B2
(45) Date of Patent: Jun. 5, 2012

(54) DATA PROCESSING APPARATUS, CONTROL METHOD THEREFOR, AND PROGRAM

(75) Inventor: Hideo Natori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1165 days.

(21) Appl. No.: 11/157,872

(22) Filed: Jun. 22, 2005

(65) Prior Publication Data

US 2006/0001686 A1 Jan. 5, 2006

(30) Foreign Application Priority Data

Jun. 30, 2004 (JP) ................................. 2004-194291

(51) Int. Cl.

| | |
|---|---|
| ***G06K 15/00*** | (2006.01) |
| ***H04N 1/60*** | (2006.01) |
| ***G06F 3/12*** | (2006.01) |
| ***B41J 29/38*** | (2006.01) |
| ***B41J 2/01*** | (2006.01) |
| ***G03G 15/00*** | (2006.01) |

(52) U.S. Cl. ...... 358/1.18; 358/1.9; 358/1.13; 358/1.15; 358/1.1; 347/16; 347/101; 347/104; 399/81; 399/82

(58) Field of Classification Search .................. 358/1.15
See application file for complete search history.

(56) References Cited

U.S. PATENT DOCUMENTS

| | | | | |
|---|---|---|---|---|
| 5,502,555 | A * | 3/1996 | Lakatos | 399/140 |
| 5,954,436 | A * | 9/1999 | Kageyama et al. | 400/188 |
| 5,999,785 | A * | 12/1999 | Vackier et al. | 399/306 |
| 6,029,020 | A * | 2/2000 | Blackman et al. | 399/45 |
| 6,149,327 | A * | 11/2000 | Ward et al. | 400/582 |
| 6,505,551 | B1 * | 1/2003 | Kawabe et al. | 101/116 |
| 6,557,965 | B2 * | 5/2003 | Walker et al. | 347/16 |
| 6,578,944 | B1 * | 6/2003 | Kamei et al. | 347/16 |
| 6,718,145 | B2 * | 4/2004 | Ohta et al. | 399/16 |
| 6,865,620 | B2 * | 3/2005 | Homma | 710/19 |
| 6,978,104 | B2 * | 12/2005 | Jang | 399/124 |
| 7,190,467 | B2 * | 3/2007 | Simpson et al. | 358/1.1 |
| 7,474,424 | B2 * | 1/2009 | Hokiyama | 358/1.15 |
| 7,520,586 | B2 * | 4/2009 | Itoh | 347/19 |
| 7,573,606 | B2 * | 8/2009 | Nomoto et al. | 358/1.9 |
| 7,596,349 | B2 * | 9/2009 | Ishiduka | 399/341 |
| 2004/0100012 | A1 * | 5/2004 | Muratani | 271/97 |

(Continued)

FOREIGN PATENT DOCUMENTS

JP 63-55622 3/1988

(Continued)

OTHER PUBLICATIONS

Office Action, dated May 12, 2008, in JP 2004-194291.

(Continued)

*Primary Examiner* — Hilina S Kassa
(74) *Attorney, Agent, or Firm* — Fitzpatrick, Cella, Harper & Scinto

(57) ABSTRACT

Print setting is executed using, as print setting items associated with printing, a setting item on the paper type of printing paper used for printing and a setting item which designates whether to execute manual duplex printing. When execution of manual duplex printing is set, the print page order of a target of manual duplex printing is controlled in accordance with the set paper type. A print command to the target of manual duplex printing is output to a printing apparatus on the basis of the controlled print page order.

13 Claims, 15 Drawing Sheets

U.S. PATENT DOCUMENTS

| | | | | |
|---|---|---|---|---|
| 2004/0179053 | A1* | 9/2004 | Itoh | 347/16 |
| 2005/0073696 | A1* | 4/2005 | Mackenzie et al. | 358/1.6 |
| 2005/0168775 | A1* | 8/2005 | Liu | 358/1.15 |
| 2005/0207807 | A1* | 9/2005 | Tombs | 399/341 |
| 2005/0210408 | A1* | 9/2005 | Baranda | 715/810 |

FOREIGN PATENT DOCUMENTS

| | | | |
|---|---|---|---|
| JP | 7-205506 | | 8/1995 |
| JP | 8-174813 | | 7/1996 |
| JP | 8-192553 | | 7/1996 |
| JP | 08174813 | A * | 7/1996 |
| JP | 9-216431 | | 8/1997 |
| JP | 9-218547 | | 8/1997 |
| JP | 09218547 | A * | 8/1997 |
| JP | 2000-037915 | | 2/2000 |
| JP | 2000-43380 | | 2/2000 |
| JP | 2003-37915 | | 2/2000 |

OTHER PUBLICATIONS

Office Action notifying Result of Reconsideration by Examiner before Appeal, dated Jan. 5, 2009, in JP 2004-194291.

* cited by examiner

DATA PROCESSING APPARATUS, CONTROL METHOD THEREFOR, AND PROGRAM

FIELD OF THE INVENTION

The present invention relates to a data processing apparatus which generates a print command associated with printing and outputs it to a printing apparatus, a control method therefor, and a program.

BACKGROUND OF THE INVENTION

Inkjet and electrophotographic printing apparatuses have been proposed as a printing apparatus in which a print command sent from a data processing apparatus such as a personal computer is processed as a visible image on printing paper.

According to the electrophotographic method, a uniformly charged photosensitive body is irradiated with an optical image corresponding to image data of one page. For this purpose, by ON/OFF-driving and controlling a semiconductor laser in accordance with a print command, the surface of the photosensitive body is irradiated with an optical image of a laser beam to form an electrostatic latent image. In order to visualize the electrostatic latent image, it is developed with toner serving as a coloring material. A printing process is executed to transfer the developed toner image onto printing paper. The electrophotographic printing apparatus as a page printer executes a printing process in accordance with a print command which expresses image data of one page.

In contrast to the page printer, there is proposed a raster printer which directly prints image data of each line or a plurality of lines as a visible image on printing paper. The raster printer can execute a printing process if image data of necessary lines are input as a print command without inputting image data of one page.

Hence, the raster printer can execute a printing process only with a raster memory corresponding to one line or a plurality of lines without any page memory which stores print commands of a plurality of pages. The raster printer can minimize the memory capacity, at the same time, can directly print on printing paper, can be downsized, and can reduce the cost.

Such a raster printer is typified by an inkjet printing apparatus. The inkjet printing apparatus directly forms dots (pixels) of ink on printing paper and obtains a visible image by scanning in a direction perpendicular to the printing paper feed direction an inkjet head having at least orifices for discharging ink.

A function generally called duplex printing is realized by forming visible images on both the upper and lower surfaces of printing paper. Duplex printing operations are roughly classified into two types. One is automatic duplex printing of forming visible images on the two surfaces of printing paper by the printer itself without the mediacy of the user. The other is manual duplex printing of forming a visible image on one surface of printing paper, then manually setting at the delivery port again the printing paper having undergone printing on one surface, and forming a visible image on the other surface.

Many inkjet printers are not equipped with a mechanism for performing automatic duplex printing because they aim at downsizing and cost reduction. Such a printer realizes duplex printing by manual duplex printing which requires the user's manipulation.

Manual duplex printing is achieved by a method which requires the user's manipulation only once in one printing, and a method which requires the user's manipulations equal in number to printing paper sheets used.

According to the former method, after printing is done on one-side surfaces of all paper sheets used for printing, the delivered printing paper sheets having undergone printing on only the one-side surfaces are manually set at the delivery port, and printing is done on the other-side surfaces of all the printing paper sheets. That is, printing is done on the upper surfaces of all printing paper sheets, and then on their lower surfaces. This method will be called normal manual duplex printing.

To the contrary, according to the latter method, after printing is done on one surface of one printing paper sheet, the delivered printing paper sheet having undergone printing on only one surface is manually set at the delivery port, and printing is done on the other surface of the paper sheet. This procedure is repeated by the number of printing paper sheets. That is, printing is done on the upper surface of one printing paper sheet, and then on its lower surface. This method will be called manual-feed manual duplex printing.

In manual duplex printing, printing paper having undergone printing on one surface side must be manually set again at the delivery port. In order to enhance user friendliness, normal manual duplex printing is often employed in which the user's manipulation is necessary only once in one printing.

In normal manual duplex printing, it takes a long time for the user to set, at the delivery port again, printing paper sheets having undergone printing on one surface after printing is done on one-side surfaces of all paper sheets used for printing. The user instructs the printing system on a timing when printing is done on the other surface. As a method of simplifying even the user instruction and further improving convenience, there is proposed a method of automatically starting printing on printing paper supplied again in the printing system on the basis of the timer (Japanese Patent Laid-Open No. 9-216431).

However, the above-mentioned prior art suffers the following problems.

Since the inkjet printer forms a visible image by discharging ink onto printing paper, a long time is taken until ink attached onto the printing paper dries. In normal manual duplex printing employed for manual duplex printing of many inkjet printers, before ink attached to a printing paper sheet completely dries, printing is done on the next printing paper sheet, and delivered printing paper sheets are stacked over each other. The progress of drying of ink changes depending on a portion of the surface of printing paper. This results in density nonuniformity, color staining, and the like in a visible image on a printed surface.

In many cases, a purpose of manual duplex printing using plain paper is document printing, and no photographic quality is required. The above problems can be somewhat solved by decreasing the ink amount used to form a visible image in printing. However, the photographic quality is required for a visible image when manual duplex printing is done using double-sided glossy paper or the like which makes it possible to print on the two surfaces of printing paper at the photographic quality. For this reason, the ink amount used cannot be simply reduced, and problems such as density nonuniformity and color staining arise more seriously than on plain paper.

A printer which always performs manual-feed manual duplex printing can output, one by one, printing paper sheets each bearing visible images on the two surfaces, and the user can dry the paper sheets having undergone printing on the two surfaces so as to prevent them from overlapping each other. However, the user must set all printing paper sheets at the delivery port one by one, and user friendliness becomes much poorer than in normal manual duplex printing. Especially when a large number of document pages is subjected to manual-feed manual duplex printing using plain paper, manual-feed manual duplex printing is not practical because a large number of printing paper sheets must be set at the delivery port one by one.

SUMMARY OF THE INVENTION

The present invention has been made to solve the above problems, and has as its object to provide a data processing apparatus which can provide a print quality optimal for a printing apparatus used and implement a user-friendly manual duplex printing function, a control method therefore, and a program.

According to the present invention, the foregoing object is attained by providing a data processing apparatus which generates a print command associated with printing and outputs the print command to a printing apparatus, comprising:

setting means for executing print setting by using, as print setting items associated with printing, a setting item on a paper type of printing paper used for printing and a setting item which designates whether to execute manual duplex printing;

control means for controlling a print page order of a target of manual duplex printing in accordance with the paper type set by the setting means when execution of manual duplex printing is set; and output means for outputting to the printing apparatus a print command to the target of manual duplex printing on the basis of the print page order controlled by the control means.

In a preferred embodiment, the control means selects, as the print page order of the target of manual duplex printing on the basis of the paper type set by the setting means, either of a) a print page order in normal manual duplex printing of printing on all surfaces of printing paper sheets on one side and then on all surfaces of the printing paper sheets on the other side, and b) a print page order in manual-feed manual duplex printing of performing for all printing paper sheets an operation of printing on one surface of one printing paper sheet and then on the other surface of the printing paper sheet.

In a preferred embodiment, the setting means further has, as the setting item, a setting item which designates whether to execute manual-feed manual duplex printing, when execution of manual duplex printing is set and execution of manual-feed manual duplex printing is not set, the control means controls the print page order of the target of manual duplex printing in accordance with the paper type set by the setting means, and when execution of manual duplex printing is set and execution of manual-feed manual duplex printing is set, the control means selects a print page order in manual-feed manual duplex printing as the print page order of the target of manual duplex printing.

In a preferred embodiment, the setting means further has, as the setting item, a setting item which designates whether to execute manual-feed manual duplex printing, and the setting means inhibits setting of the setting item which designates whether to execute manual-feed manual duplex printing, on the basis of a setting state of the setting item on manual duplex printing.

In a preferred embodiment, the setting means further has, as the setting item, a setting item which designates whether to execute manual-feed manual duplex printing, and the setting means inhibits setting of the setting item which designates whether to execute manual-feed manual duplex printing, on the basis of a setting state of the setting item on the paper type.

In a preferred embodiment, the apparatus further comprises notification window output means for switching and outputting, on the basis of an output state of the print command from the output means when control by the control means is to be executed, a notification window which prompts a user to set new printing paper at a sheet supply port of the printing apparatus, and a notification window which prompts the user to set printing paper having undergone printing on an upper surface at the sheet supply port.

In a preferred embodiment, the setting means further has, as the setting item, a setting item on print quality, and when execution of manual duplex printing is set, the control means controls the print page order of the target of manual duplex printing in accordance with at least one of the paper type and the print quality which are set by the setting means.

According to the present invention, the foregoing object is attained by providing a method of controlling a data processing apparatus which generates a print command associated with printing and outputs the print command to a printing apparatus, comprising:

a setting step of executing print setting by using, as print setting items associated with printing, a setting item on a paper type of printing paper used for printing and a setting item which designates whether to execute manual duplex printing;

a control step of controlling a print page order of a target of manual duplex printing in accordance with the paper type set in the setting step when execution of manual duplex printing is set; and an output step of outputting to the printing apparatus a print command to the target of manual duplex printing on the basis of the print page order controlled in the control step.

According to the present invention, the foregoing object is attained by providing a program for implementing control of a data processing apparatus which generates a print command associated with printing and outputs the print command to a printing apparatus, comprising:

a program code for a setting step of executing print setting by using, as print setting items associated with printing, a setting item on a paper type of printing paper used for printing and a setting item which designates whether to execute manual duplex printing;

a program code for a control step of controlling a print page order of a target of manual duplex printing in accordance with the paper type set in the setting step when execution of manual duplex printing is set; and a program code for an output step of outputting to the printing apparatus a print command to the target of manual duplex printing on the basis of the print page order controlled in the control step.

According to the present invention, the foregoing object is attained by providing a data processing apparatus comprising:

determination means for determining whether a first setting is made; and execution means for, when the determination means determines that the first setting is made, executing a printing process of prompting a user to reverse a printing paper sheet and print on a second surface every time one page is printed on a first surface, and when the determination means determines that no first setting is made, executing a printing process of prompting a user to print a plurality of pages on first surfaces at once, then reverse printing paper sheets, and print on second surfaces.

In a preferred embodiment, the setting includes paper.

In a preferred embodiment, the setting includes print quality.

According to the present invention, the foregoing object is a printing control method comprising:

a determination step of determining whether a first setting is made; and an execution step of, when the first setting is determined in the determination step to be made, executing a printing process of prompting a user to reverse a printing paper sheet and print on a second surface every time one page is printed on a first surface, and when the first setting is determined in the determination step not to be made, executing a printing process of prompting a user to print a plurality of pages on first surfaces at once, then reverse printing paper sheets, and print on second surfaces.

In a preferred embodiment, the setting includes paper.

In a preferred embodiment, the setting includes print quality.

According to the present invention, the foregoing object is attained by providing a program comprising:

a program code for a determination step of determining whether a first setting is made; and a program code for an execution step of, when the first setting is determined in the determination step to be made, executing a printing process of prompting a user to reverse a printing paper sheet and print on a second surface every time one page is printed on a first surface, and when the first setting is determined in the determination step not to be made, executing a printing process of prompting a user to print a plurality of pages on first surfaces at once, then reverse printing paper sheets, and print on second surfaces.

In a preferred embodiment, the setting includes paper.

In a preferred embodiment, the setting includes print quality.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

In the following description, USB stands for a universal serial bus and is a known interface capable of two-way communication, and a detailed description thereof will be omitted.

<Arrangement of Printing System>

Figure 1:
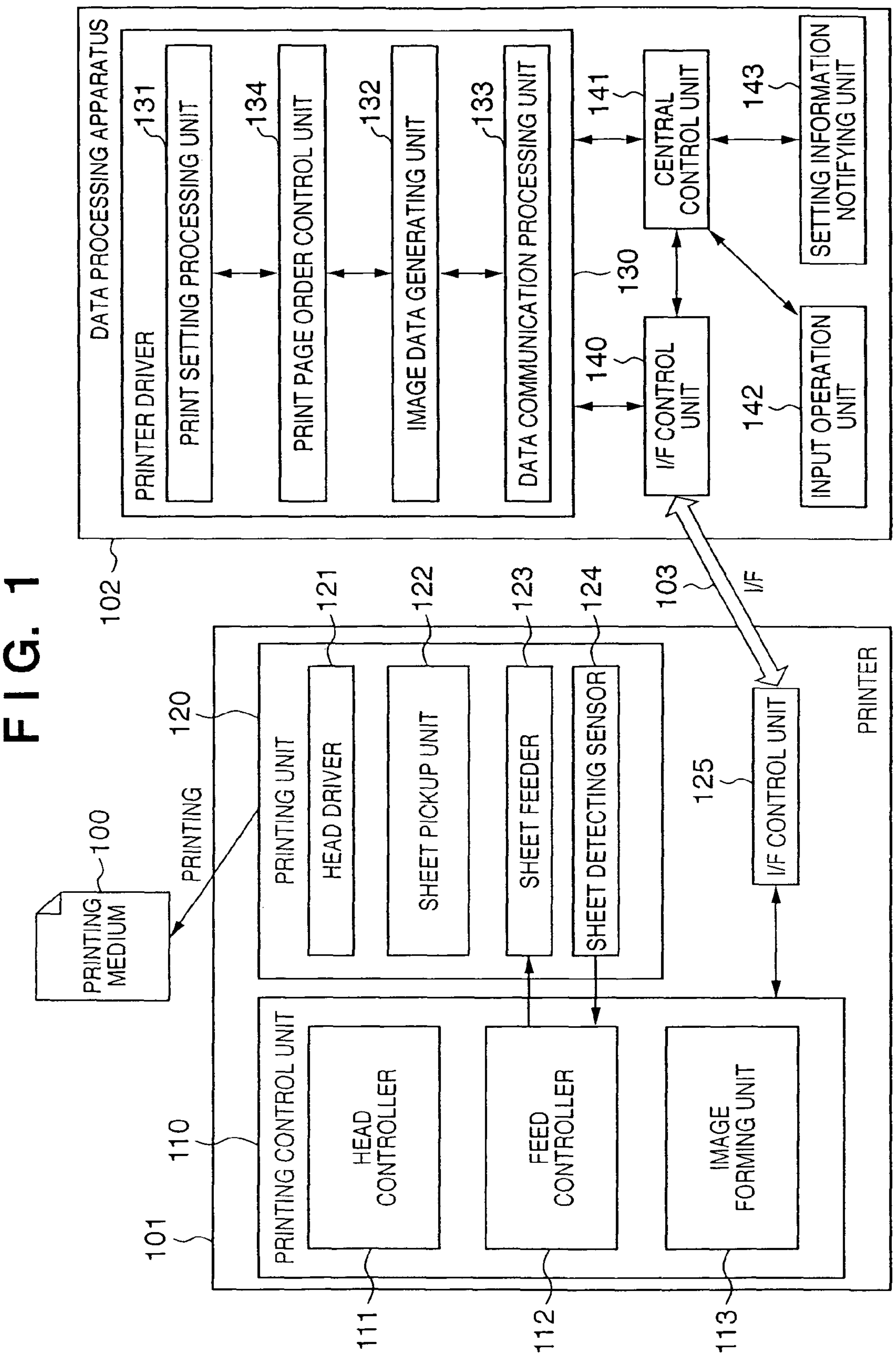
FIG. 1 is a block diagram showing the arrangement of a printing system according to the first embodiment of the present invention.

FIG. 1 is a block diagram showing the arrangement of a printing system according to the first embodiment of the present invention.

In FIG. 1, a printer 101 is an inkjet printing apparatus which forms an image. The printer 101 forms an image on the basis of a print command generated by a data processing apparatus 102 (to be described later). The type of printing apparatus does not matter, and the first embodiment assumes an inkjet color printer. Other types of printers are various printing types of printers such as a laser beam printer and thermal transfer printer.

The printer 101 is comprised of various functional blocks 110 to 113 and 120 to 125.

In the data processing apparatus 102, application software creates a print job, and the printer driver creates image data from a print instruction of the print job. The data processing apparatus 102 generates a print command for controlling printing operation of the connected printer 101. In the first embodiment, the data processing apparatus 102 is implemented by a personal computer. The data processing apparatus 102 also has a role of receiving an instruction and input pertaining to print settings from the user.

The data processing apparatus 102 is comprised of various functional blocks 130 to 134 and 140 to 143. For example, Microsoft Windows® XP as an operating system (to be abbreviated as OS hereinafter) which controls the data processing apparatus 102 is installed in the data processing apparatus 102, and the above functional blocks operate on the OS.

A communication interface (I/F) 103 connects the data processing apparatus 102 and printer 101. The first embodiment assumes a USB serial interface as the communication interface 103, but the communication interface 103 is not limited to this. For example, serial interfaces such as IEEE1394, Ethernet®, IrDA, IEEE802.11, and power line are assumable. In addition to serial interfaces, various interfaces such as Centronics and SCSI are assumable as parallel interfaces. Any communication interface can be adopted regardless of whether the interface is of a wire or radio type as far as it can realize two-way communication between the data processing apparatus 102 and the printer 101.

The printing system according to the first embodiment is not a single apparatus but takes an arrangement in which the data processing apparatus 102 and the printer 101 for forming an image are connected by the specific two-way communication interface 103. However, the printing system is not limited to this example, and may be an integrated printing system in which the functions of the data processing apparatus 102 and printer 101 are integrated.

A description of functions of the printer 101 and data processing apparatus 102 that are not necessary to describe features of the first embodiment will be omitted.

In the printer 101, the printing control unit 110 receives a print command transmitted from the data processing apparatus 102, and controls printing operation of the printing unit 120. The printing unit 120 feeds a printing medium 100, or prints on the printing medium 100. The printing medium 100 is generally called printing paper, and is stacked on a sheet supply portion such as a sheet supply tray or cassette of the printer 101.

The head controller 111 controls operation of the head driver 121, and causes the head driver 121 to discharge ink from the orifice of the inkjet head. The feed controller 112 supplies the printing media 100 one by one from the sheet supply tray or sheet supply cassette of the printer 101, and feeds the printing medium 100 to a print enable position via a fixed position on the feed path. The feed controller 112 controls the sheet feeder 123 in order to perform delivery operation at the same time as raster printing.

The image forming unit 113 rasterizes image data contained in a print command issued from the data processing apparatus 102. The printing control unit 110 has a memory used as a work area for control operation by the printing control unit 110 and to rasterize image data and save a received print command, and the memory is used by the image forming unit 113.

The printing control unit 110 comprehensively controls the image forming unit 113 serving as a printer engine in accordance with a print control command contained in a print command.

More specifically, the printing control unit 110 can be implemented when a CPU (not shown) executes a program which describes control procedures. Print control commands are various commands to control quantized printing image data (binary data or intermediate data before binarization), the ink discharge amount, the number of passes, the print direction, and the printing paper feed amount, and a command formed from an instruction of a paper type set by the input operation unit 142 (to be described later).

The head driver 121 prints on the printing medium 100 on the basis of image data of a print command rasterized by the printing control unit 110. The printer 101 is an inkjet printer, and forms an image by discharging ink from the inkjet head.

The sheet pickup unit 122 picks up the printing medium 100 stacked on the sheet supply tray or sheet supply cassette onto the feed path. The sheet feeder 123 feeds the printing medium 100 set on the feed path by the sheet pickup unit 122 to a delivery portion via a fixed position along the feed path. The sheet detecting sensor 124 is located midway along the feed path, detects the end of the printing medium 100 during feed, and confirms that the printing medium 100 is at the fixed position on the feed path.

The I/F (interface) control unit 125 provides an interface function of the printer 101. In the first embodiment, the interface used is a USB, and the I/F control unit 125 is formed from a controller on the peripheral device side of the USB. The I/F control unit 125 transmits paper type information and receives data such as a print command. The I/F control unit 125 transmits, to the data processing apparatus 102 on request, status information on an error generated in the main body of the printer 101 or a communication state.

In the data processing apparatus 102, the central control unit 141 controls various functions of the data processing apparatus 102, and corresponds to the function of the CPU. The input operation unit 142 is made up of various input devices (mouse, keyboard, touch panel, and the like) which reflect the intention of the user on print settings.

The setting information notifying unit 143 notifies the user of print settings. As the notifying method, a display (CRT or LCD) such as a monitor may be used, or sound may be generated. The I/F control unit 140 provides the interface function of the data processing apparatus 102. The I/F control unit 140 is formed from a controller on the host side of the USB, and has functions of the USB host. Some of the functions of the USB host are also implemented by software such as an OS or driver.

The printer driver 130 is software for performing various print settings, generating print data, and controlling the printer 101 by the data processing apparatus 102. The central control unit 141 (i.e., the CPU of the personal computer) executes the program of the printer driver 130, implementing the functions of the functional blocks such as the print setting processing unit 131, print page order control unit 134, image data generating unit 132, and data communication processing unit 133.

The print setting processing unit 131 performs various print settings including setting of the printing paper and setting of the print quality. The print setting processing unit 131 has a function of receiving an instruction and input from the user and displaying set contents or sending a notification of the set contents. The print page order control unit 134 controls the page order of print data of a print job created by an application, rearranges pages in the order of reverse printing, sort printing, duplex printing, or the like, and supplies print data of each page to the image data generating unit 132.

The image data generating unit 132 creates image data from print data supplied from the print page order control unit 134, and generates a print command. The print command of the print job created by the image data generating unit 132 is sent to the I/F control unit 140 via the data communication processing unit 133, and the print command is sent to the printer 101.

<Printer Structure>

The schematic structure of an inkjet printer as an example of the printer 101 will be explained with reference to FIG. 2.

Figure 2:
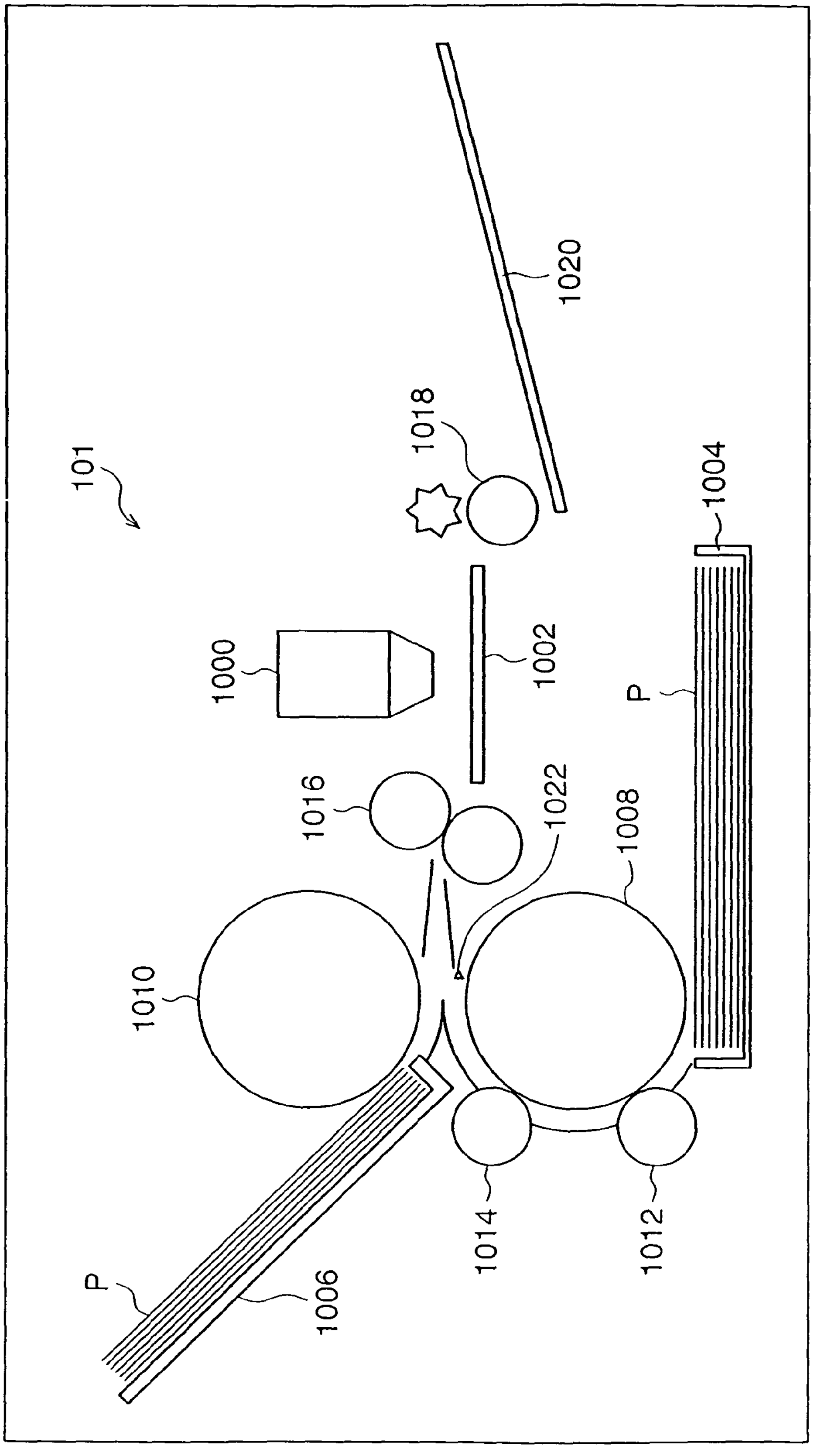
FIG. 2 is a view showing the schematic structure of an inkjet printer according to the first embodiment of the present invention.

FIG. 2 is a view showing the schematic structure of the inkjet printer according to the first embodiment of the present invention.

A description of functions which are not necessary to describe features of the first embodiment will be omitted.

An inkjet printer as a raster printer has a minimum raster memory enough to store image data of one raster or a plurality of rasters contained in a print command transferred from the data processing apparatus 102. The inkjet printer can execute a printing process using image data rasterized in the raster memory.

An inkjet head 1000 is reciprocally scanned in a direction perpendicular to the sheet surface of FIG. 2, and discharges ink to a portion (to be referred to as a print position) opposite to the inkjet head 1000. Printing paper P (one printing paper P will also be referred to as a sheet hereinafter) serving as the printing medium 100 is fed by a predetermined amount every scanning by the inkjet head 1000.

Printing paper sheets P are stored in a sheet supply cassette 1004 and sheet supply tray 1006 for automatic sheet supply that are detachably mounted in the main body of the printer 101. The printing paper P is selectively supplied from either the sheet supply cassette 1004 or sheet supply tray 1006 in accordance with print settings in a print setting dialog (e.g., FIGS. 4A and 4B) implemented in the data processing apparatus 102. A sheet feed roller 1008 is arranged at a portion corresponding to the leading end of paper above the sheet supply cassette 1004 while the sheet supply cassette 1004 is mounted. The sheet feed roller 1008 press-contacts the top printing paper P in the sheet supply cassette 1004. By driving the sheet feed roller 1008, the top printing paper P is supplied to the print position.

For the sheet supply tray 1006, a sheet feed roller 1010 is arranged at a portion corresponding to the leading end of paper. In printing, the sheet feed roller 1010 press-contacts the top printing paper P in the sheet supply tray 1006 by a sheet supply tray cam. By driving the sheet feed roller 1010, the top printing paper P is supplied.

With this structure, either the sheet feed roller 1010 or 1008 for supplying paper from the sheet supply tray 1006 or sheet supply cassette 1004 is selected and driven to supply one printing paper P at the top of the sheet supply tray 1006 or sheet supply cassette 1004.

Printing paper of an arbitrary size can also be set in the sheet supply tray 1006, and the user can set printing paper of a size different from that in the sheet supply cassette 1004. The printing paper P selectively supplied from the sheet supply cassette 1004 or sheet supply tray 1006 is fed to the position of feed rollers 1016 which are arranged in front of the print position where the inkjet head 1000 is located.

The feed rollers 1016 temporarily stop the supplied printing paper P, and starts feeding it to the print position of the inkjet head 1000 in synchronism with printing operation. A platen 1002 which supports the printing paper P from its lower surface and stabilizes the print state is arranged at the print position facing the inkjet head 1000. The inkjet head 1000 and platen 1002 form a printing unit at the print position.

In the inkjet head 1000, orifices for discharging ink dots are formed on a side facing the print surface of the printing paper P, and ink supplied from an ink supply unit is discharged from the orifices by the head driver 121 (FIG. 1). The inkjet head 1000 is reciprocally scanned in a direction (main scanning direction) perpendicular to the feed direction (sub-scanning direction) of the printing paper P, i.e., in a direction perpendicular to the sheet surface on the printing paper P fed from left to right in FIG. 2. During scanning, the inkjet head 1000 discharges ink dots to form on the print surface of the printing paper P a visible image corresponding to image data formed from a plurality of rasters.

In scanning by the inkjet head 1000, feed of the printing paper P stops, scanning in one direction is done, and after an image corresponding to one scanning is formed, the printing paper P is fed by an amount corresponding to the number of printed rasters. This operation is repeated in each direction of reciprocal scanning, forming a printed image of image data of one page on the printing paper P.

The printing paper P having passed through the print position facing the inkjet head 1000 is discharged outside the main body of the printer 101 via a discharge roller 1018 arranged on the downstream side of the print position. A discharge tray 1020 is arranged at the discharge position, and a printed sheet is discharged onto the discharge tray 1020 with the printed image facing up.

When a print command of the next page is sent from the data processing apparatus 102, the printer 101 controls to start supplying the next printing paper P and feed it to the feed rollers 1016. When the printing paper P is supplied from the sheet supply cassette 1004, the supplied printing paper P is reversed and then fed to the feed rollers 1016. Reversal support rollers 1012 and 1014 for supporting the printing paper P in reversal are arranged on a feed path extending from the sheet supply cassette 1004 to the feed rollers 1016.

A printing paper detecting sensor 1022 is arranged on the upstream side of the feed rollers 1016, and detects the presence/absence of the printing paper P supplied from the sheet supply tray 1006 or sheet supply cassette 1004. The printing paper detecting sensor 1022 may be a mechanical sensor such as a microswitch or an optical sensor such as a photosensor. The printing paper detecting sensor 1022 outputs a presence signal when the printing paper P exists, and an absence signal when no printing paper P exists. The printing paper detecting sensor 1022 outputs a signal representing the presence of printing paper when the leading end of the printing paper passes through the printing paper detecting sensor 1022, and a signal representing the absence of printing paper after the printing paper passes. In this manner, the leading and trailing ends of printing paper are detected. In addition, a printing paper delivery process can be normally completed, and in manual duplex printing, the user can be notified at a proper timing to set printing paper having undergone printing on one surface at the delivery port.

<Operation of Printer Driver>

Operation of the printer driver 130 will be explained with reference to FIG. 3.

Figure 3:
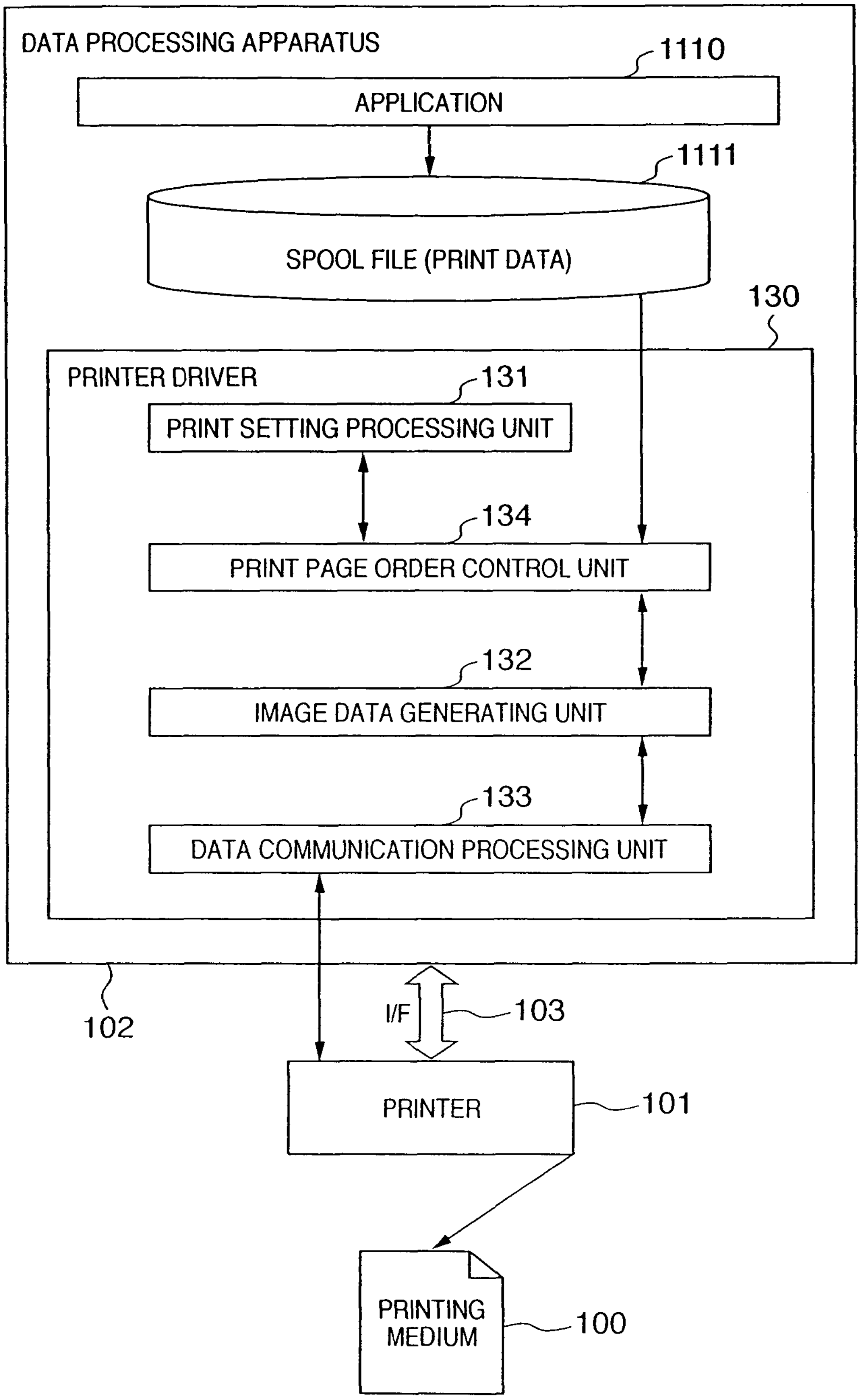
FIG. 3 is a block diagram for explaining operation of a printer driver according to the first embodiment of the present invention.

FIG. 3 is a block diagram for explaining operation of the printer driver according to the first embodiment of the present invention.

An application 1110 for creating a document to be printed runs in the data processing apparatus 102. When a document is created by the application 1110 and a printing process for the created document is to be executed, the application 1110 allows the user to perform various print settings by using a print setting dialog (to be described later) from the print setting processing unit 131 of the printer driver 130 via the printing function of the OS.

First, the application 1110 starts a printing process for a document. Then, the application 1110 starts a page printing process for each page of the document, stores data contained in the page of the document as print data in a spool file 1111 via the printing function of the OS, and ends the page printing process of each page. The application 1110 performs this process for pages of the document to be printed, and then ends the document printing process.

The document created by the application 1110 is stored in the spool file 1111 with the print data format. At a timing when the application 1110 starts/ends the document printing process or starts/ends the page printing process, the printer driver 130 is notified of the start/end of the document or page by the printing function of the OS. The spool file 1111 can exploit a function provided as part of the OS.

The print page order control unit 134 of the printer driver 130 supplies print data stored in the spool file 1111 page by page to the image data generating unit 132 in a page order complying with the print setting of manual duplex printing or the like. The image data generating unit 132 creates image data to be printed from the print data supplied from the print page order control unit 134, and converts the created image data into a print command interpretable by the printer 101.

The print command created by the image data generating unit 132 is transmitted to the printer 101 via the data communication processing unit 133 and the I/F 103 which connects the data processing apparatus 102 and printer 101. The printer 101 is controlled by the received print command, and forms the image data as a visible image on the printing medium 100.

<Print Setting Window>

An example of a print setting window (print setting dialog) displayed when a printing mode is set or various paper settings are made according to the first embodiment will be explained with reference to FIGS. 4A and 4B.

Figure 4A:
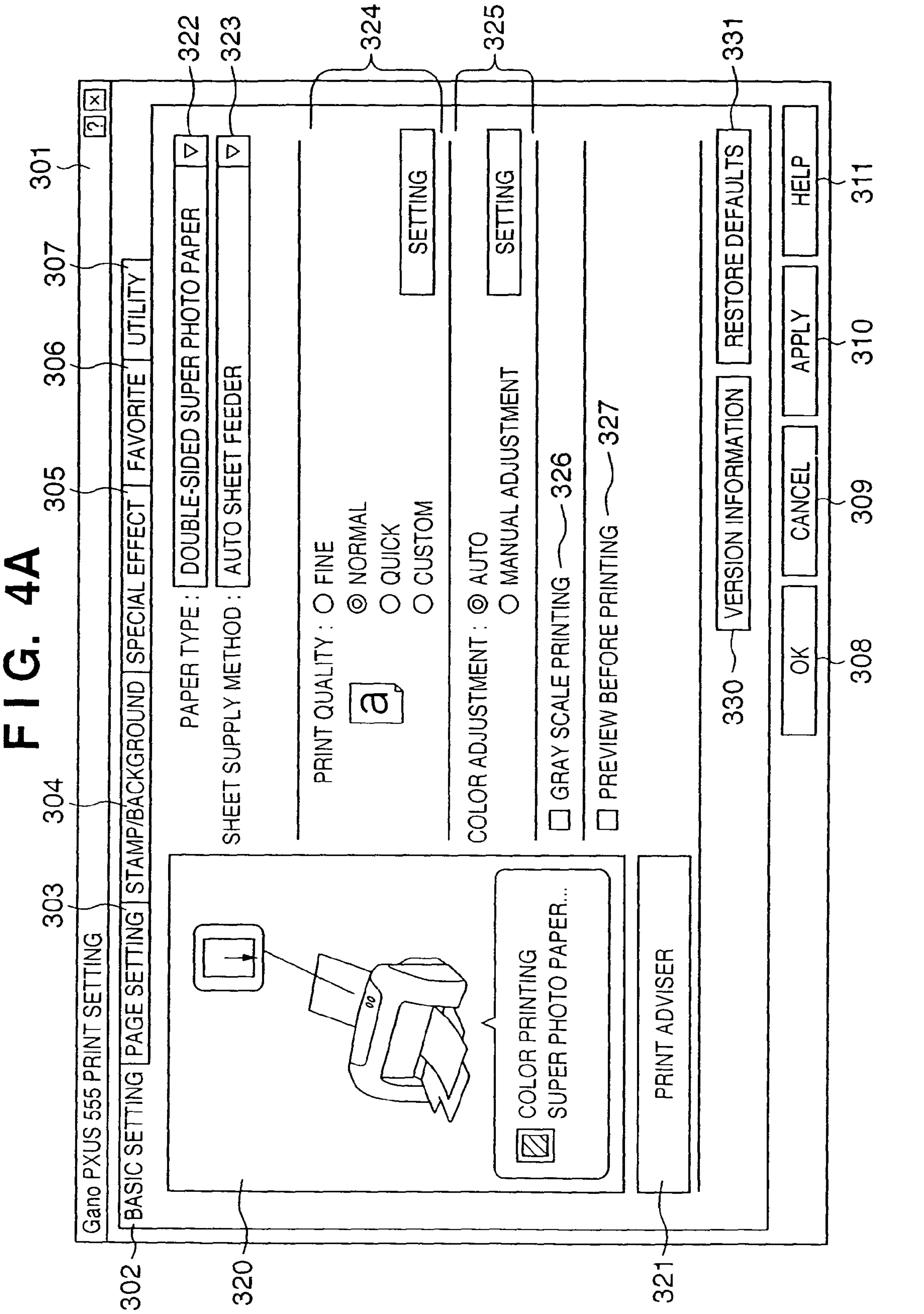
FIG. 4A is a view showing an example of a print setting dialog according to the first embodiment of the present invention.
Figure 4B:
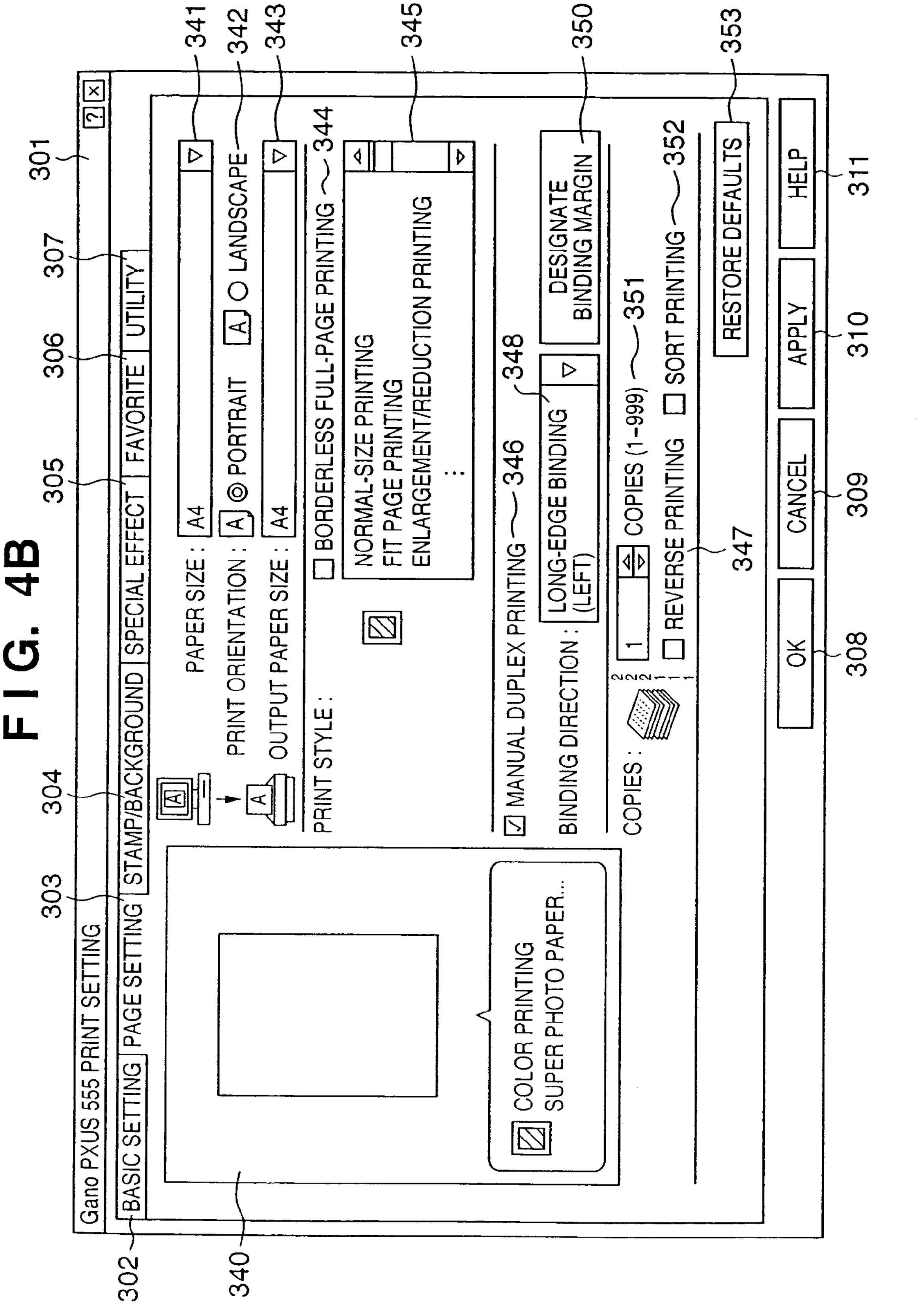
FIG. 4B is a view showing another example of the print setting dialog according to the first embodiment of the present invention.

FIGS. 4A and 4B are views showing an example of the print setting dialog according to the first embodiment of the present invention.

In FIG. 4A, a print setting dialog 301 is formed from display areas 302 to 311 and 320 to 331. Since many setting items are displayed in print setting, the setting items are generally classified by their contents using tab sheets for an easy-to-see layout. The first embodiment also adopts a plurality of tab sheets. Similarly in FIG. 4B, the print setting dialog 301 is formed from the display areas 302 to 311 and display areas 340 to 353.

The basic setting tab 302 displays the contents of the basic settings of printing. The page setting tab 303 displays the contents of various page settings such as the paper size of printing paper, print direction (print orientation), and print layout (N-up). Details of these tabs will be described later.

N-up means a process of laying out and printing a document of N pages (N pages or more (N-up)) on one sheet.

The stamp/background tab 304 displays a window for selecting a pattern to be added in printing without changing a print document, and the selection patterns include a stamp function of superposing a character on a print document and a background function of superposing an image. The special effect tab 305 displays a window for selecting a function used to give an image a special effect such as various image smoothing processes and sepia tone conversion. The favorite tab 306 displays a window for selecting saving and invoking functions for frequently used print settings and the like. The utility tab 307 displays a window for selecting functions such as head adjustment and cleaning.

FIG. 4A shows a display example when the basic setting tab 302 is selected.

The simple display area 320 of the basic setting tab 302 displays not only character information but also image information which is set to appeal to the eye. When the print adviser 321 is selected, the print adviser 321 displays a subdialog having a function of guiding the user stepwise to optimal print settings on the basis of the printing purpose in order to prompt the user to properly input print settings.

The paper type selection field 322 displays a paper type and can prompt the user to select a paper type. The paper type selection field 322 provides a drop-down menu, displays a selected paper type in a normal state, and when clicked, displays a list of selectable paper types. Selectable paper types are paper types printable by the printer 101, and include plain paper, glossy paper, coated paper, photo paper, and postcard in addition to double-sided super photo paper (double-sided glossy paper) shown in FIG. 4A.

The sheet supply method selection field 323 displays a sheet supply method of supplying printing paper from the main body of the printer 101, and can prompt the user to select a sheet supply method. The user can select from the sheet supply method selection field 323 a sheet supply tray (auto sheet feeder) or sheet supply cassette serving as an automatic sheet supply port.

The print quality selection field 324 provides setting items for prompting the user to set the print quality, and is formed from radio buttons. Setting items in the field 324 are "fine", "normal", "quick", and "custom". The color adjustment field 325 provides setting items for prompting the user to adjust the print color, and is formed from radio buttons. Setting items in the field 325 are "auto" and "manual adjustment". The grayscale setting field 326 is a check box for converting the print result of even a color print document into a grayscale. The preview setting field 327 is a check box for previewing a print image before printing.

The version information button 330 is used to display a subdialog representing the version of a driver for displaying the print setting dialog 301. When the normal setting field 331 is clicked, various settings on the basic setting tab 302 are restored to defaults (settings upon shipping).

After properly selecting setting items, the user clicks the OK button 368 to close the print setting dialog 301 and can reflect selected print settings in printing. If the user clicks the cancel button 309, the print setting dialog 301 is closed, and the contents of selected setting items are discarded and not reflected in printing. The apply button 310 can reflect selected print settings in printing while the print setting dialog 301 is kept open. The help button 311 can display in a different window a description of each setting item of the basic setting tab 302.

FIG. 4B shows a display example when the page setting tab 303 is selected.

The simple display area 320 of page setting displays not only character information but also image information which is set to appeal to the eye. The paper size selection field 341 displays the paper size of a document created by an application, and can prompt the user to select a paper size. The output paper size selection field 343 displays a paper size used to print by the printer 101, and can prompt the user to select a paper size.

The paper size selection field 341 and output paper size selection field 343 include A4 shown in FIG. 4B and also paper sizes such as A5, B5, Letter, and postcard which can be used in the printer 101. The paper size selection field 341 may prepare B4, A3, A2, and the like which cannot be processed by the printer 101.

The print orientation selection field 342 allows the user to select the orientation of a document created by an application. The borderless full-page printing selection field 344 for the print style is a check box capable of designating printing without any margin on printing paper. The print style selection field 345 allows setting normal-size printing, fit page printing of fitting an application document into an output paper size, enlargement/reduction printing capable of setting an arbitrary enlargement ratio, a print layout (N-up), and the like.

The manual duplex printing selection field 346 is a check box capable of selecting whether to perform manual duplex printing. The binding direction selection field 348 can designate a binding side upon printing. When the user clicks the binding margin designation button 350, another dialog is displayed to enable the user to set a binding margin.

The reverse order designation field 347 is a check box for setting the page order to a reverse order. The print copy count setting field 351 provides an item which prompts the user to set the number of copies. By setting a numerical value representing the number of copies, the printer driver 130 repetitively prints print data of a print job created by an application by the number of times represented by the set numerical value, obtaining copies of print results. The sort setting field 352 is a check box for setting whether to print copy by copy, and the setting becomes valid when the setting of the print copy count 351 is 2 or more.

When the normal setting field 353 is clicked, various settings on the page setting tab 303 are restored to defaults (settings upon shipping).

In print settings of a document, the manual duplex printing selection field 346 in FIG. 4B becomes operable only when a printing medium capable of duplex printing is set as a paper type.

<Print Page Order of Manual Duplex Printing>

The print page order of manual duplex printing will be explained with reference to FIGS. 5A to 5F.

FIGS. 5A to 5F are views for explaining the print page order of manual duplex printing according to the first embodiment of the present invention.

In duplex printing, the total number of print pages for executing printing on one surface (upper surface) of printing paper and then on the other surface (lower surface), i.e., printing on both the upper and lower surfaces is conveniently regarded as an even number. If the total number of pages of a print document created by an application is an odd number, the even-numbered page of the lower surface of printing paper is regarded as a blank page.

Figures 5A, 5B, 5C, 5D, 5E, 5F:
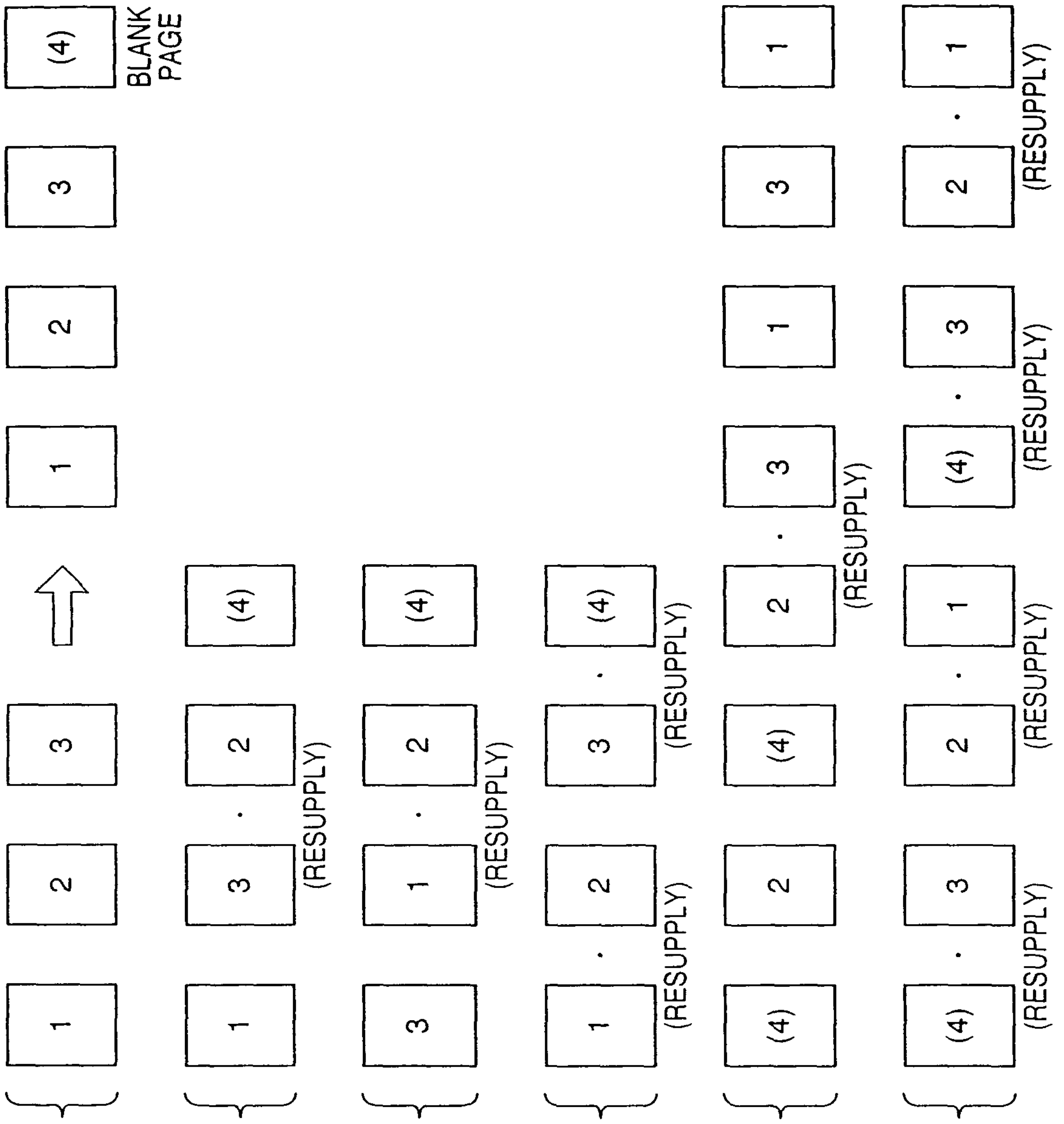
FIG. 5A is a view for explaining the print page order of manual duplex printing according to the first embodiment of the present invention.
FIG. 5B is a view for explaining the print page order of manual duplex printing according to the first embodiment of the present invention.
FIG. 5C is a view for explaining the print page order of manual duplex printing according to the first embodiment of the present invention.
FIG. 5D is a view for explaining the print page order of manual duplex printing according to the first embodiment of the present invention.
FIG. 5E is a view for explaining the print page order of manual duplex printing according to the first embodiment of the present invention.
FIG. 5F is a view for explaining the print page order of manual duplex printing according to the first embodiment of the present invention.

For example, when the number of pages of a print document created by the application is three, the fourth page is regarded as a blank page, as shown in FIG. 5A. Only when the total number of pages of a print document created by the application is one, the same page order control as that for single-sided printing suffices because manual duplex printing need not be done on the lower surface.

In performing manual duplex printing, printing paper having undergone printing on one surface must be manually set again at the delivery port, and this operation will be called resupply. In resupply, the printed surface faces downward in the sheet supply tray 1006 of FIG. 2, but upward in the sheet supply cassette 1004.

In resupply for normal manual duplex printing and manual-feed manual duplex printing, the print page order must be changed depending on the type of sheet supply port. This will be explained with reference to FIGS. 5B and 5C.

FIG. 5B shows the print page order of the print document shown in FIG. 5A when normal manual duplex printing is done using the sheet supply tray 1006. Odd-numbered pages are printed on printing paper sheets in ascending order of the first and third pages. Then, the printing paper sheets having undergone printing on one surface are supplied again in the sheet supply tray 1006, and even-numbered pages are printed in an order of the second and fourth pages. Full circles "•" in FIG. 5B represent resupply timings.

FIG. 5C shows a print page order when normal manual duplex printing is done using the sheet supply cassette 1004. Odd-numbered pages are printed on printing paper sheets, and then the printed surfaces must face upward in resupply. For this purpose, odd-numbered pages are printed in descending order of the third and first pages from a larger-number page. The printing paper sheets having undergone printing on one surface are supplied again in the sheet supply cassette, and even-numbered pages are printed in an order of the second and fourth pages.

In order to make the page orders of printed materials obtained finally coincide with each other between the use of the sheet supply tray 1006 and the use of the sheet supply cassette 1004, the print page order of pages first subjected to single-sided printing in the use of the sheet supply cassette 1004 must be reversed from the order in the use of the sheet supply tray. The following description assumes the use of the sheet supply tray 1006 for convenience.

FIG. 5D shows the print page order of manual-feed manual duplex printing of printing on each printing paper sheet in an order of upper and lower surfaces. As the print page order of manual-feed manual duplex printing, an even-numbered page is printed following an odd-numbered page, and an odd-numbered page is printed following an even-numbered page. Hence, the first page is printed, and then the printing paper having undergone printing on one surface is set in the sheet supply tray 1006 to print the second page. The third page is printed on new printing paper, and then the printing paper having undergone printing on one surface is set in the sheet supply tray 1006 to print the fourth page.

If no reverse printing is set and the number of copies is one, the above-mentioned page order control an be performed to achieve manual duplex printing. As n example of page order control with complicated print settings, page order control with reverse setting, two copies, and sort print setting will be explained with reference to FIGS. 5E and 5F.

FIG. 5E shows a print page order when normal manual duplex printing is executed with the above settings. To print even-numbered pages on one-side surfaces, the order of the fourth and second pages is repeated twice because of sort printing, resulting in the order of the fourth, second, fourth, and second pages. Printing paper sheets having undergone printing on one surface are supplied again, and odd-numbered pages are repeated twice in the order of the third and first pages, resulting in the order of the third, first, third, and first pages.

FIG. 5F shows a print page order when manual-feed manual duplex printing is executed with the above settings. To print in descending order from the final page, after the fourth page is printed, a printing paper sheet whose one surface bears the fourth page is supplied again to print the third page, and after the second page is printed, a printing paper sheet whose one surface bears the second page is supplied again to print the first page. This operation is repeated twice.

As described above, in page order control of manual duplex printing, the page order can be determined in consideration of the number of pages of a print document created by an application, print settings, and the characteristic (sheet supply method) of a sheet supply port used for resupply regardless of whether manual duplex printing is normal manual duplex printing or manual-feed manual duplex printing. In resupply, the user must be notified of a correct procedure of setting printing paper at the sheet supply port, which will be described below with reference to FIGS. 6A, 6B, and 7.

<Resupply Notification>

A notification window (notification dialog) which is presented to the user in resupply in manual duplex printing will be explained with reference to FIGS. 6A, 6B, and 7.

Figure 6A:
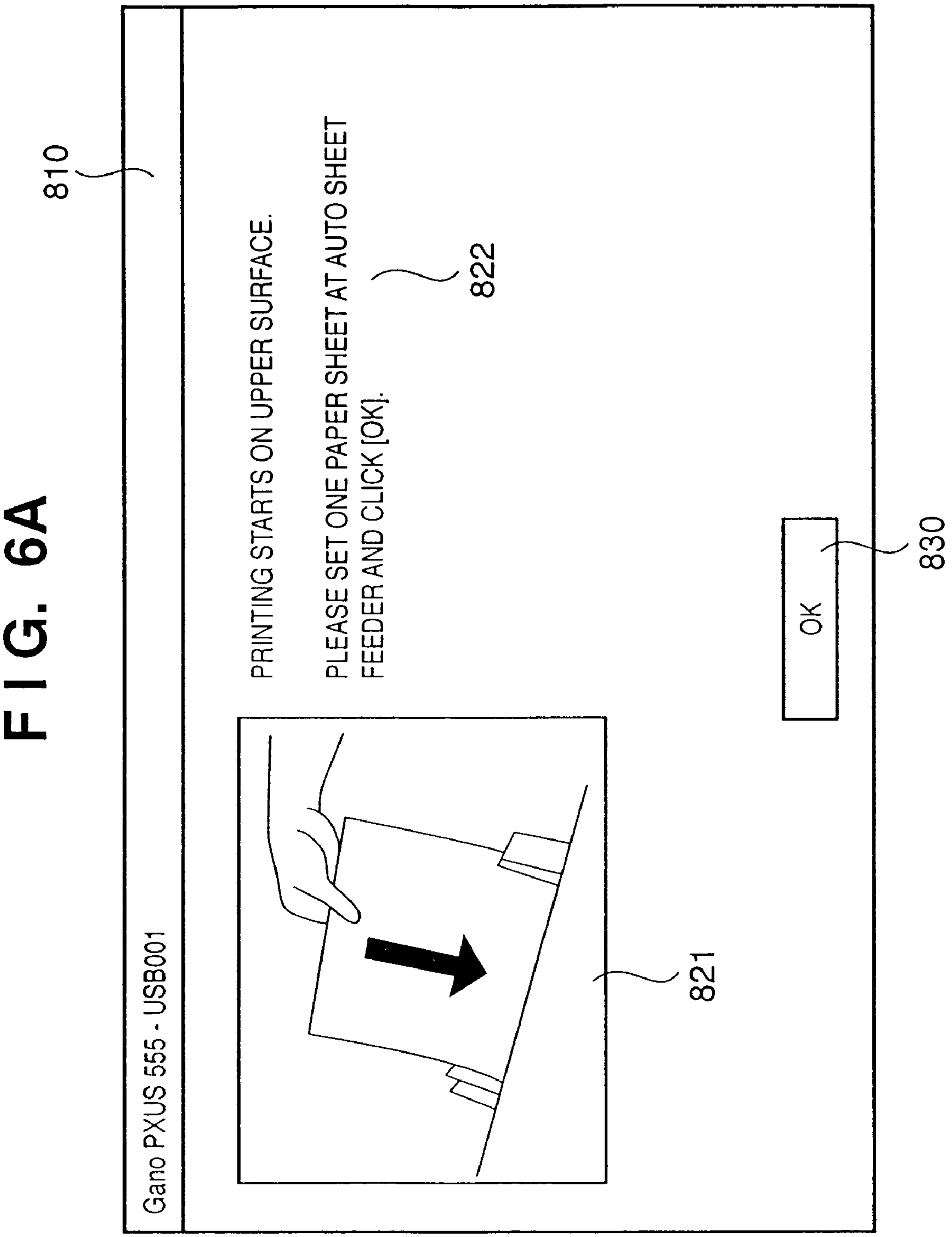
FIG. 6A is a view showing an example of a notification dialog displayed when new printing paper needs to be set by the user in manual-feed manual duplex printing according to the first embodiment of the present invention.

FIG. 6A is a view showing an example of a notification dialog displayed when new printing paper needs to be set by the user in manual-feed manual duplex printing according to the first embodiment of the present invention. FIG. 6B is a view showing an example of a notification dialog displayed when printing paper needs to be supplied again in manual-feed manual duplex printing according to the first embodiment of the present invention. FIG. 7 is a view showing an example of a notification dialog displayed when printing paper needs to be supplied again by the user in normal manual duplex printing according to the first embodiment of the present invention.

In manual duplex printing, printing is done on one surface of blank printing paper, and then on the other surface. For convenience, one surface subjected to printing first will be called an upper surface, and the other surface subjected to printing next will be called a lower surface.

In manual-feed manual duplex printing, the above-described operation of printing on the upper surface of printing paper and then on the lower surface is executed for all printing paper sheets. In manual-feed manual duplex printing, the operation of printing on the lower surface subsequent to the upper surface is repeated. Before printing is done on the lower surface, printing paper must be supplied again, and the user is correctly notified of a message to this effect. If blank printing paper is set at the sheet supply port, the user may forget to supply printing paper again in printing on the lower surface. Such errors by the user can be reduced by prompting the user to set one new printing paper in printing on the upper surface without setting any printing paper at the sheet supply port.

In this manner, in manual-feed manual duplex printing, notifications (FIGS. 6A and 6B) are preferably presented to the user in printing on the upper surface and printing on the lower surface.

FIG. 6A shows an example of a notification dialog displayed immediately before the printer driver 130 starts printing on the upper surface.

A notification dialog 810 is formed from display areas 821, 822, and 830. The image display area 821 expresses a description of setting new printing paper by a simple illustration, and helps the user understand the description. The operation procedure display area 822 expresses by a text the description of setting new printing paper in printing on the upper surface. The operation procedure display area 822 prompts the user to set new printing paper in the auto sheet feeder, i.e., the sheet supply tray 1006 in FIG. 2. The user sets new printing paper at the designated sheet supply port and clicks the OK button 830 to start printing on the upper surface.

Figure 6B:
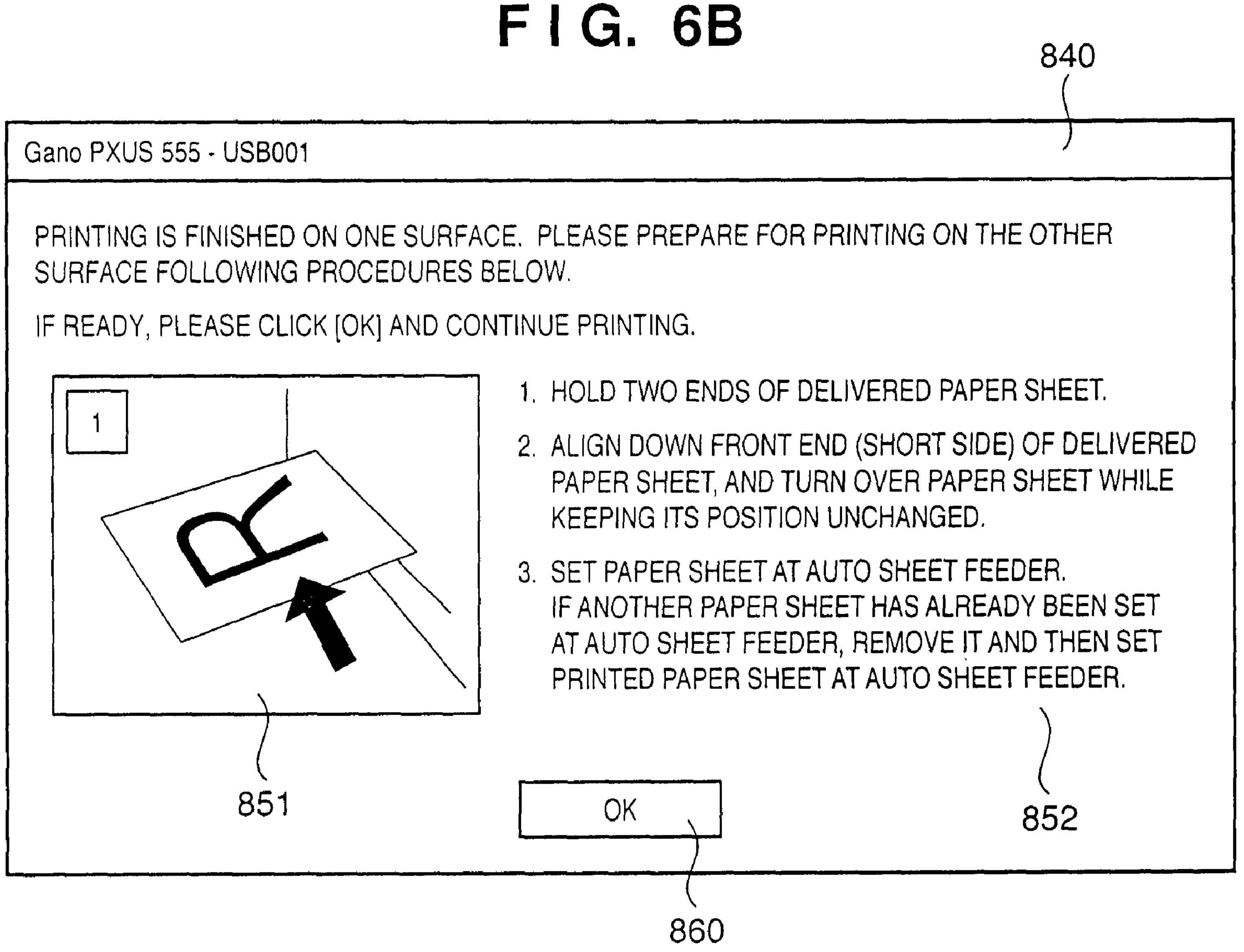
FIG. 6B is a view showing an example of a notification dialog displayed when printing paper needs to be supplied again in manual-feed manual duplex printing according to the first embodiment of the present invention.

FIG. 6B shows an example of a notification dialog displayed immediately before the printer driver 130 starts printing on the lower surface.

A notification dialog 840 is formed from display areas 851, 852, and 860. The operation procedure display area 852 expresses by a text a description of setting printing paper having undergone printing on the upper surface when printing is to be executed on the lower surface. The operation procedure display area 852 prompts the user to set printing paper having undergone printing on the upper surface in the auto sheet feeder, i.e., the sheet supply tray 1006 in FIG. 2. The image display area 851 expresses operation procedures stepwise by a simple illustration in accordance with the operation procedure display area 852. The user sets printing paper having undergone printing on the upper surface at the designated sheet supply port and clicks the button 860 to start printing on the lower surface.

If a printing paper sheet has already been set in resupply, the operation procedure display area 852 prompts the user to remove the set printing paper sheet and then set a printing paper sheet having undergone printing on the upper surface, and the notification dialog in FIG. 6A is displayed. This can reduce operation errors such as printing on the lower surface of new printing paper by the user.

In normal manual duplex printing, printing is done on all upper surfaces and then on lower surfaces. Printing should be continuously executed on upper surfaces. For this purpose, blank printing paper sheets should be set at the sheet supply port, and the user suffices to be notified of resupply procedures immediately before printing on the lower surface (FIG. 7).

Figure 7:
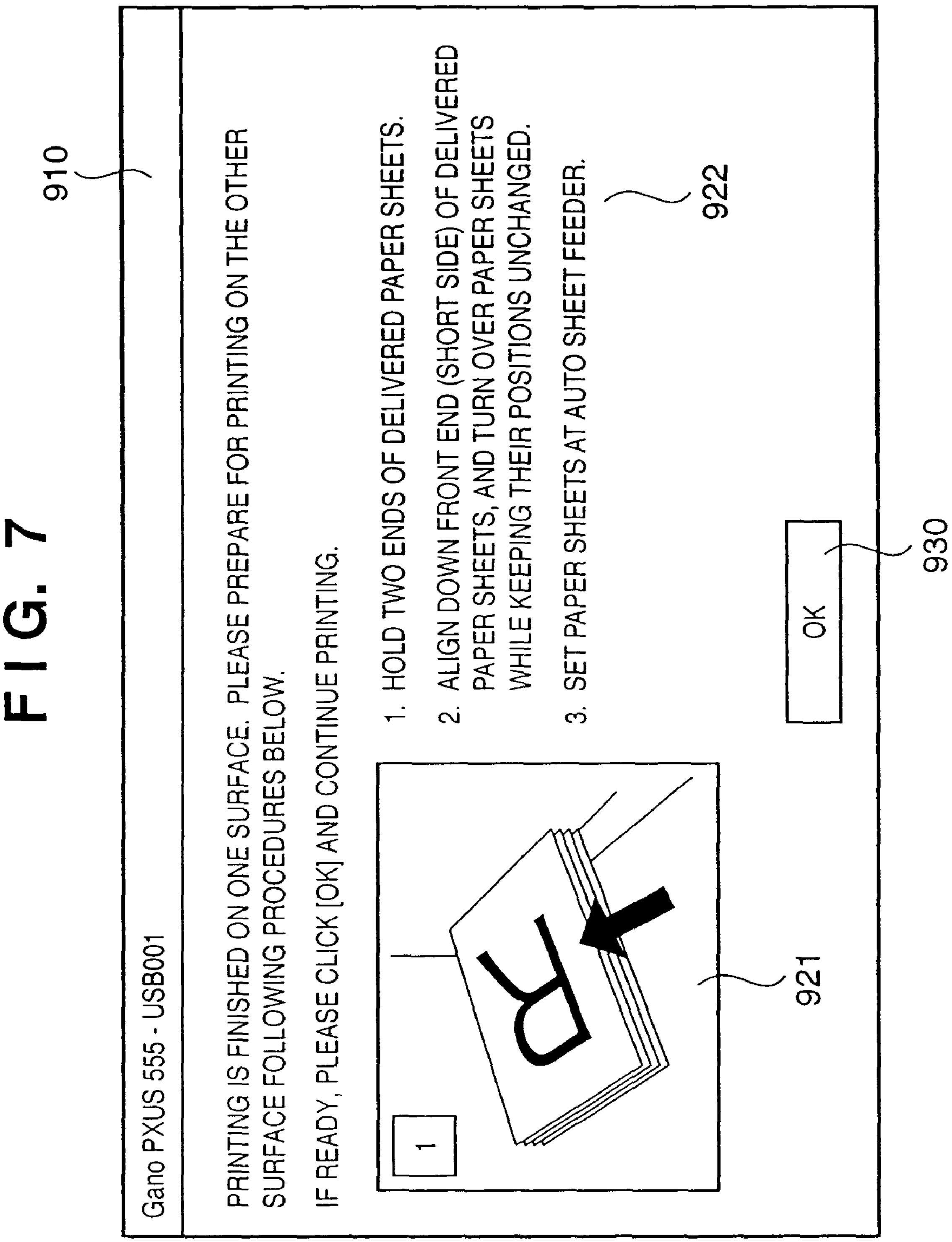
FIG. 7 is a view showing an example of a notification dialog displayed when printing paper needs to be supplied again by the user in normal manual duplex printing according to the first embodiment of the present invention.

FIG. 7 shows an example of a notification dialog displayed immediately before the printer driver starts printing on the lower surface.

A notification dialog 910 is formed from display areas 921, 922, and 930. The operation procedure display area 922 expresses by a text a description of supplying again printing paper sheets having undergone printing on their upper surfaces when printing is to be executed on their lower surfaces. The operation procedure display area 922 prompts the user to set printing paper sheets having undergone printing on their upper surfaces in the auto sheet feeder, i.e., the sheet supply tray 1006 in FIG. 2. The image display area 921 expresses operation procedures stepwise by a simple illustration in accordance with the operation procedure display area 922. The user sets printing paper sheets having undergone printing on their upper surfaces at the designated sheet supply port and clicks the button 930 to start printing on their lower surfaces.

By presenting a notification to the user, correct resupply operation can be performed in manual duplex printing. The sheet supply port used is a sheet supply tray in the above example, but may be a sheet supply cassette. By changing resupply procedures, the function of the binding direction selection field 348 in FIG. 4B can also be implemented.

<Print Order Control on Upper and Lower Surfaces by Printer Driver>

Print order control on upper and lower surfaces by the printer driver 130 will be described with reference to FIGS. 8 to 11.

As described above with reference to FIGS. 5A to 5F, the print page order of manual duplex printing changes depending on the number of pages of a print document created by an application, print settings, and a sheet supply port used.

Control of reverse print setting among print settings is simple because the page order is simply reversed. Control of sort setting must be devised because page numbers assigned to upper and lower surfaces greatly change depending on setting values. Print order control on upper and lower surfaces by the printer driver 130 according to the first embodiment will be described by giving attention to copy setting, particularly, sort setting.

Figure 8:
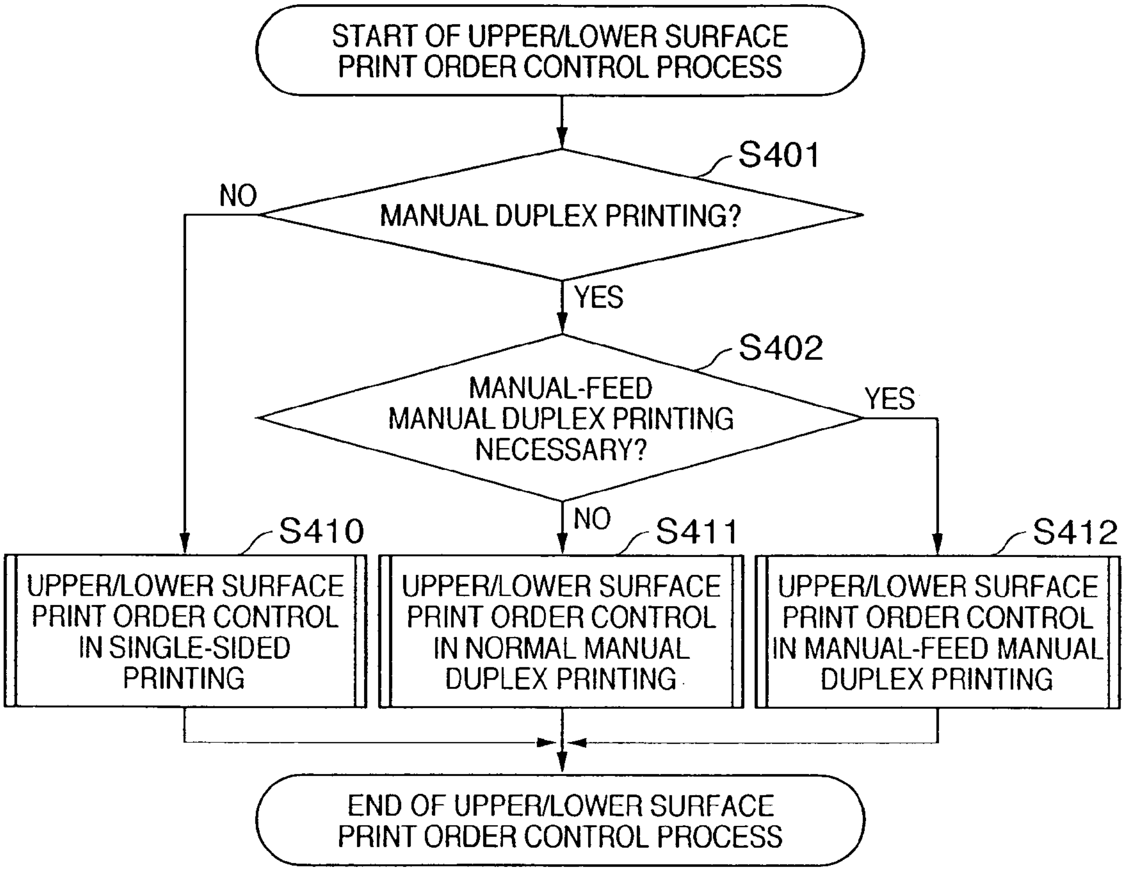
FIG. 8 is a flowchart showing an upper/lower surface print order control process executed by the print page order control unit of a printer driver in printing according to the first embodiment of the present invention.

FIG. 8 is a flowchart showing an upper/lower surface print order control process executed by the print page order control unit of the printer driver in printing according to the first embodiment of the present invention.

In step S401, it is determined whether manual duplex printing is designated in print settings made in printing. If no manual duplex printing is set (NO in step S401), the flow advances to step S410 to execute upper/lower surface print order control in single-sided printing. If manual duplex printing is set (YES in step S401), the flow advances to step S402.

In step S402, it is determined whether the paper type set in print settings requires manual-feed manual duplex printing. If manual-feed manual duplex printing is necessary (YES in step S402), the flow advances to step S412 to execute upper/lower surface print order control in manual-feed manual duplex printing. If manual-feed manual duplex printing is not necessary (NO in step S402), the flow advances to step S411 to execute upper/lower surface print order control in normal manual duplex printing.

In this way, the printer driver 130 automatically determines and controls the printing method of manual duplex printing in accordance with the paper type set in printing. The user can execute a proper printing method of manual duplex printing without any consciousness of setting of the printing method of manual duplex printing.

In determination in step S402, when delivered printing paper sheets are stacked over each other, the progress of ink drying changes depending on a portion of the surface of printing paper. For printing paper on which a visible image on the printed surface suffers density nonuniformity, color staining, or the like, manual-feed manual duplex printing is determined to be necessary. Especially in the first embodiment, when the type of printing paper is double-sided glossy paper, manual-feed manual duplex printing is determined to be necessary.

In the first embodiment and the second embodiment (to be described later), manual-feed manual duplex printing is selected and executed in step S402 as a printing method of manual duplex printing in accordance with the paper type, but the present invention is not limited to this.

For example, manual-feed manual duplex printing may be selected and executed as a printing method of manual duplex printing in accordance with particularly a print setting about the print state (e.g., the printing amount and the drying speed of a printing agent) of a printing agent attached to printing paper among print settings except the paper type. In this arrangement, for example, the amount of a printing agent (ink) attached to printing paper is larger at the print quality "fine (high quality)" than at "quick (poor quality)". In this case, manual-feed manual duplex printing is selected and executed as a printing method of manual duplex printing.

Further, manual-feed manual duplex printing may be selected and executed as a printing method of manual duplex printing in accordance with a combination of the printing paper type and the print quality. In this arrangement, for example, the amount of a printing agent attached to printing paper is larger at the printing paper "plain paper" and print quality "fine" than at "quick". In this case, manual-feed manual duplex printing is selected and executed as a printing method of manual duplex printing. To the contrary, the amount of a printing agent attached to printing paper is smaller at the printing paper "plain paper" and print quality "quick" than at "fine". In this case, normal manual duplex printing is selected and executed as a printing method of manual duplex printing.

Details of processes in steps S410, S411, and S412 will be explained with reference to FIGS. 9 to 11.

Figure 9:
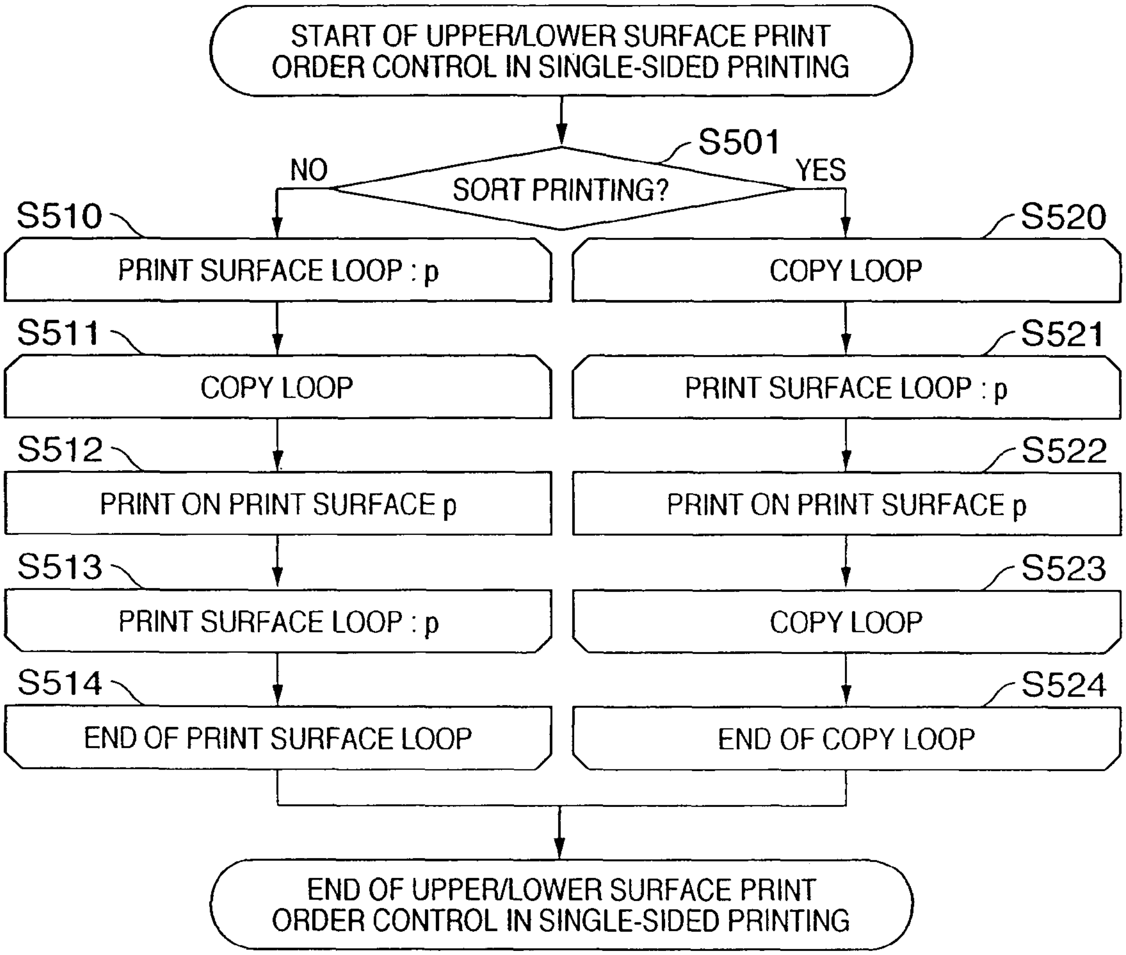
FIG. 9 is a flowchart showing details of upper/lower surface print order control in single-sided printing in step S410 according to the first embodiment of the present invention.

FIG. 9 is a flowchart showing details of upper/lower surface print order control in single-sided printing in step S410 according to the first embodiment of the present invention.

In step S501, it is determined whether sort printing is designated by the print setting. If no sort printing is designated (NO in step S501), the flow advances to processes from step S510 to execute a normal copy printing process. If sort printing is designated (YES in step S501), the flow advances to processes from step S520 to execute a sort printing process.

The normal copy printing process in steps S510 to S514 will be explained.

In step S510, a print surface loop starts to sequentially control the print surface p up to the final page of a print document. In step S511, a copy loop starts and is repeated by the number of copies designated by the print setting. In step S512, a printing process for the print surface p is executed by reading out print data corresponding to the print surface p of the print document from the spool file 1111 and supplying the print data to the image data generating unit 132.

The copy loop ends in step S513, and the flow returns to step S511 to sequentially repeat the process until the repeat count reaches the number of copies designated by the print setting. The print surface loop ends in step S514, and the flow returns to step S510 to repeat the process until the print surface p reaches the final page of the print document. After the final page is printed, the control ends.

Next, the sort printing process in steps S520 to S524 is executed.

Since sort printing is designated, the copy loop starts in step S520 and is repeated by the number of copies designated by the print setting. In step S521, the print surface loop starts to sequentially control the print surface p up to the final page of a print document. In step S522, a printing process for the print surface p is executed by reading out print data corresponding to the print surface p of the print document from the spool file 1111 and supplying the print data to the image data generating unit 132.

The print surface loop ends in step S523, and the flow returns to step S521 to repeat the process until the print surface p reaches the final page of the print document. The copy loop ends in step S524, and the flow returns to step S520 to repeat the process until the repeat count reaches the number of copies designated by the print setting.

As described above, printing suffices to be done on only upper surfaces in upper/lower surface print order control in single-sided printing by the print page order control unit 134. This control can be implemented by replacing the copy loop and print surface loop in accordance with whether the print setting designates sort printing.

Figure 10:
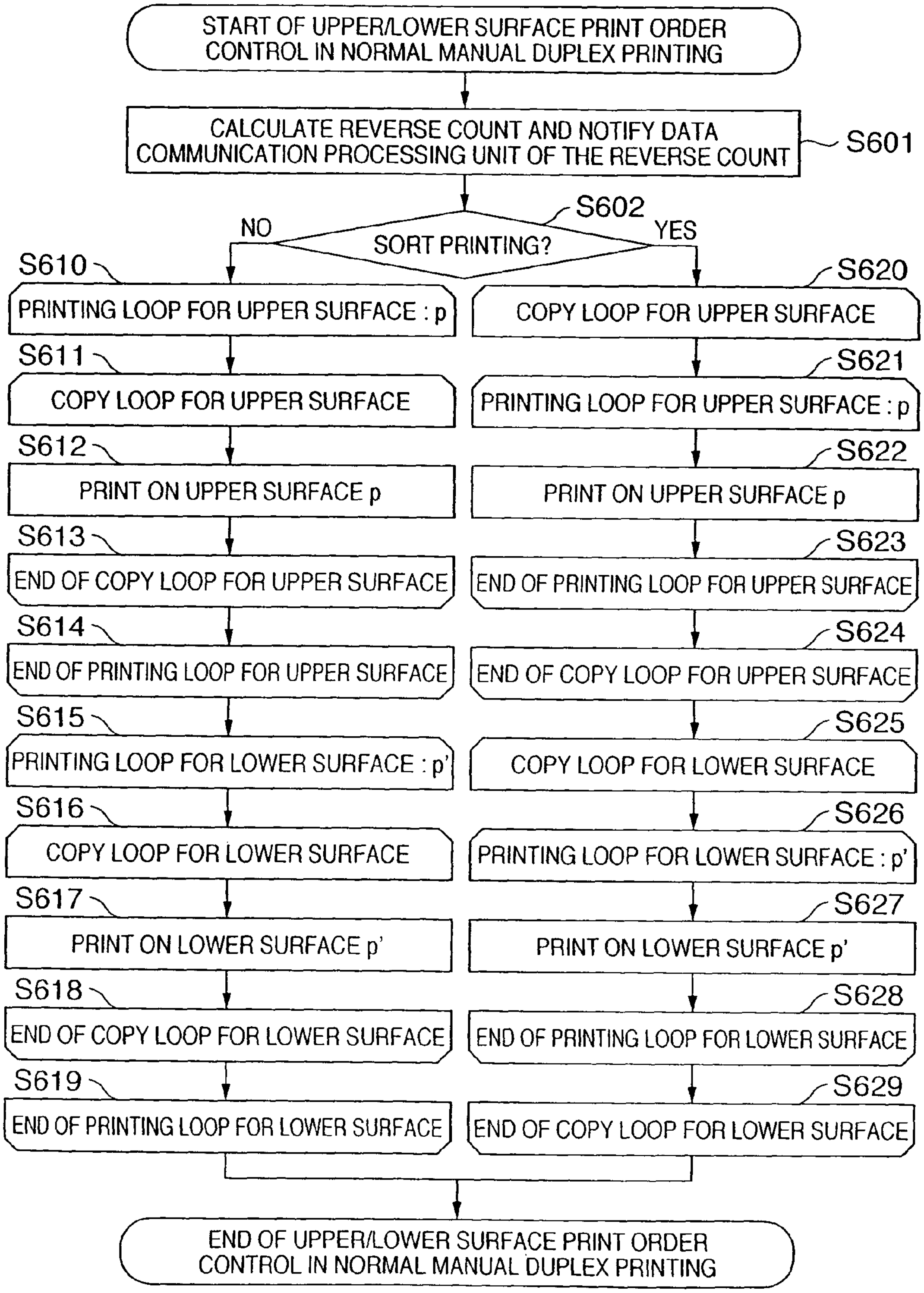
FIG. 10 is a flowchart showing details of upper/lower surface print order control in normal manual duplex printing in step S411 according to the first embodiment of the present invention.

FIG. 10 is a flowchart showing details of upper/lower surface print order control in normal manual duplex printing in step S411 according to the first embodiment of the present invention.

In step S601, the total number of upper surfaces of a document to be printed is calculated and sent as a reverse count to the data communication processing unit 133. In step S602, it is determined whether sort printing is designated by the print setting. If no sort printing is designated (NO in step S602), the flow advances to processes from step S610 to execute a normal copy printing process. If sort printing is designated (YES in step S602), the flow advances to processes from step S620 to execute a sort printing process.

The normal copy printing process in steps S610 to S619 will be explained.

In step S610, a printing loop for upper surfaces starts to sequentially control the upper surface p up to the final upper surface of the print document. In step S611, a copy loop for upper surfaces starts and is repeated by the number of copies designated by the print setting. In step S612, a printing process for the upper surface p is executed by reading out print data corresponding to the upper surface p of the print document from the spool file 1111 and supplying the print data to the image data generating unit 132.

The copy loop for upper surfaces ends in step S613, and the flow returns to step S611 to sequentially repeat the process until the repeat count reaches the number of copies designated by the print setting. The printing loop for upper surfaces ends in step S614, and the flow returns to step S610 to repeat the process until the upper surface p reaches the final upper surface. In step S615, a printing loop for lower surfaces starts to sequentially control the lower surface p' up to the final lower surface of the print document.

In step S616, a copy loop for lower surfaces starts and is repeated by the number of copies designated by the print setting. In step S617, a printing process for the lower surface p' is executed by reading out print data corresponding to the lower surface p' of the print document from the spool file 1111 and supplying the print data to the image data generating unit 132.

The copy loop for lower surfaces ends in step S618, and the flow returns to step S616 to sequentially repeat the process until the repeat count reaches the number of copies designated by the print setting. The loop for lower surfaces ends in step S619, and the flow returns to step S615 to repeat the process until the lower surface p' reaches the final lower surface. After the final page is printed, the control ends.

Next, the sort printing process in steps S620 to S629 is executed.

In step S620, a copy loop for upper surfaces starts and is repeated by the number of copies designated by the print setting. In step S621, a printing loop for upper surfaces starts to sequentially control the upper surface p up to the final upper surface of the print document. In step S622, a printing process for the upper surface p is executed by reading out print data corresponding to the upper surface p of the print document from the spool file 1111 and supplying the print data to the image data generating unit 132.

The printing loop for upper surfaces ends in step S623, and the flow returns to step S621 to repeat the process until the upper surface p reaches the final upper surface. The copy loop for upper surfaces ends in step S624, and the flow returns to step S620 to sequentially repeat the process until the repeat count reaches the number of copies designated by the print setting.

In step S625, a copy loop for lower surfaces starts and is repeated by the number of copies designated by the print setting. In step S626, a printing loop for lower surfaces starts to sequentially control the lower surface p' up to the final lower surface of the print document. In step S627, a printing process for the lower surface p' is executed by reading out print data corresponding to the lower surface p' of the print document from the spool file 1111 and supplying the print data to the image data generating unit 132.

The loop for lower surfaces ends in step S628, and the flow returns to step S626 to repeat the process until the lower surface p' reaches the final lower surface. The copy loop for lower surfaces ends in step S629, and the flow returns to step S625 to sequentially repeat the process until the repeat count reaches the number of copies designated by the print setting. After the final page is printed, the control ends.

As described above, in upper/lower surface print order control in normal manual duplex printing by the print page order control unit 134, printing is done on all upper surfaces by repeating the sort loop in the printing loop for upper surfaces, and then printing is done on all the lower surfaces by repeating the sort loop in the printing loop for lower surface. When sort printing is designated by the print setting, control of the print surface can be implemented by replacing the copy loop and print surface loop.

In normal manual duplex printing, the user must be prompted to supply sheets again before printing on lower surfaces starts after the end of printing on all upper surfaces.

The data communication processing unit 133 transmits print commands by the number of pages corresponding to the reverse count to the printer 101, temporarily interrupts transmission, and displays the notification dialog of FIG. 7 on the screen, correctly prompting the user to execute resupply operation. When the user supplies sheets again and clicks the OK button on the notification dialog of FIG. 7, the data communication processing unit 133 restarts transmitting print commands, and printing can be done on lower surfaces.

Figure 11:
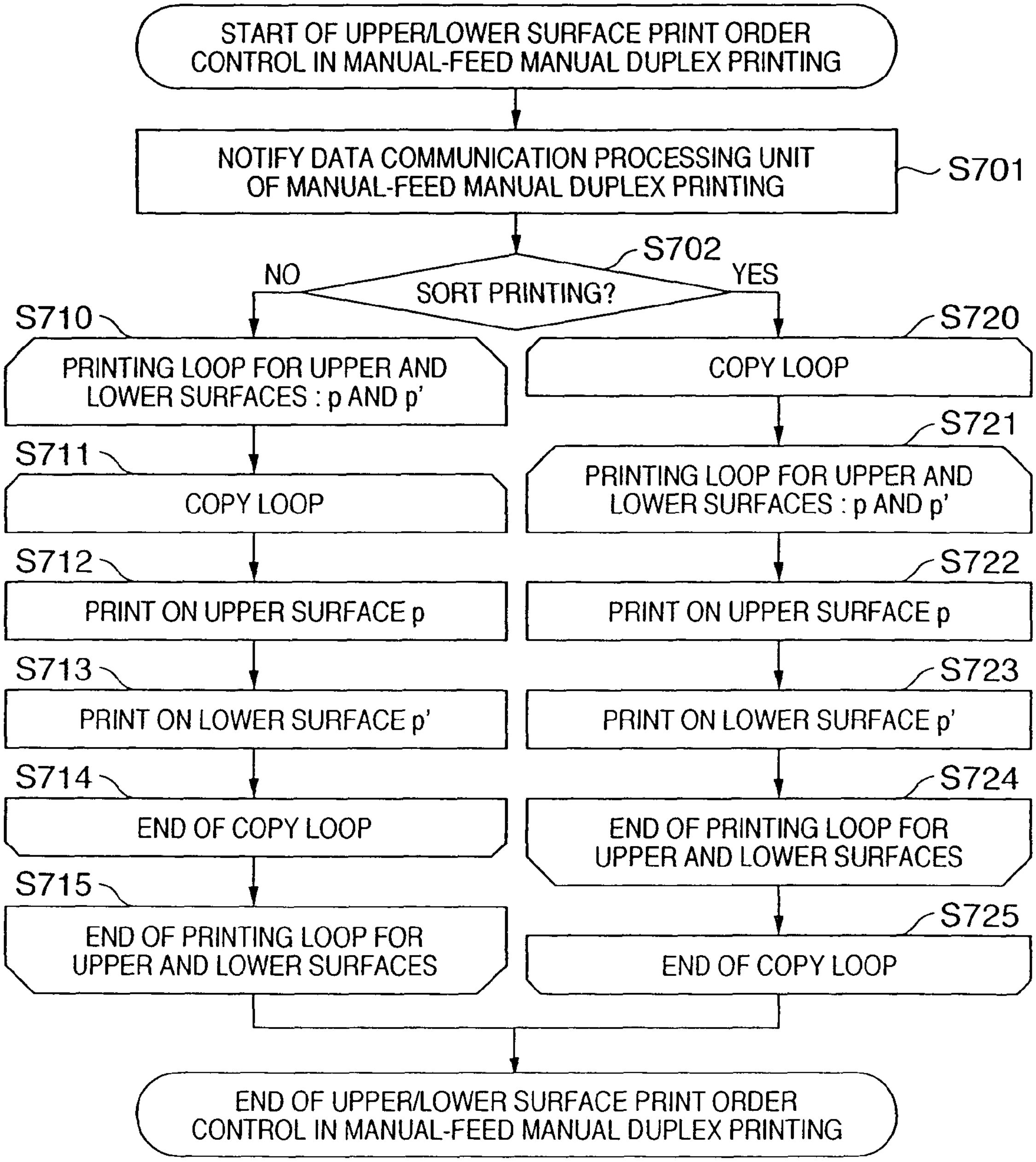
FIG. 11 is a flowchart showing details of upper/lower surface print order control in manual-feed manual duplex printing in step S412 according to the first embodiment of the present invention.

FIG. 11 is a flowchart showing details of upper/lower surface print order control in manual-feed manual duplex printing in step S412 according to the first embodiment of the present invention.

In step S701, the data communication processing unit 133 is notified of manual-feed manual duplex printing. In step S702, it is determined whether sort printing is designated by the print setting. If no sort printing is designated (NO in step S702), the flow advances to processes from step S710 to execute a normal copy printing process. If sort printing is designated (YES in step S702), the flow advances to processes from step S720 to execute a sort printing process.

The normal copy printing process in steps S710 to S715 will be explained.

In step S710, a printing loop for upper and lower surfaces starts to sequentially control the upper surface p and lower surface p' up to the final lower surface of a print document. In step S711, a copy loop starts and is repeated by the number of copies designated by the print setting. In step S712, a printing process for the upper surface p is executed by reading out print data corresponding to the upper surface p of the print document from the spool file 1111 and supplying the print data to the image data generating unit 132.

In step S713, a printing process for the lower surface p' is executed by reading out print data corresponding to the lower surface p' of the print document from the spool file 1111 and supplying the print data to the image data generating unit 132. The copy loop ends in step S714, and the flow returns to step S711 to sequentially repeat the process until the repeat count reaches the number of copies designated by the print setting. The print surface loop ends in step S715, and the flow returns to step S710 to repeat the process until the lower surface p' reaches the final lower surface of the print document. After printing is done on the final surface, the control ends.

Next, the sort printing process in steps S720 to S725 is executed.

In step S720, a copy loop starts and is repeated by the number of copies designated by the print setting. In step S721, a printing loop for upper and lower surfaces starts to sequentially control the upper surface p and lower surface p' up to the final lower surface of the print document. In step S722, a printing process for the upper surface p is executed by reading out print data corresponding to the upper surface p of the print document from the spool file 1111 and supplying the print data to the image data generating unit 132.

In step S723, a printing process for the lower surface p' is executed by reading out print data corresponding to the lower surface p' of the print document from the spool file 1111 and supplying the print data to the image data generating unit 132. The print surface loop ends in step S724, and the flow returns to step S720 to repeat the process until the lower surface p' reaches the final lower surface of the print document. The copy loop ends in step S725, and the flow returns to step S721 to sequentially repeat the process until the repeat count reaches the number of copies designated by the print setting. After printing is done on the final surface, the control ends.

As described above, in upper/lower surface print order control in manual-feed manual duplex printing by the print page order control unit 134, printing is done first on upper surfaces and then on corresponding lower surfaces while repeating the sort loop in the printing loop for upper and lower surfaces. When sort printing is designated by the print setting, control of the print surface can be implemented by replacing the copy loop and print surface loop.

In manual-feed manual duplex printing, the user must be prompted to set blank printing paper sheets at the sheet supply port, print on the upper surfaces, then supply the sheets again before printing on the lower surfaces.

Before transmitting print commands corresponding to print data of upper surfaces to the printer 101, the data communication processing unit 133 displays the notification dialog of FIG. 6A on the screen, and can correctly prompt the user to correctly set new printing paper sheets. After transmitting print commands for upper surfaces, the data communication processing unit 133 temporarily interrupts transmission again, displays the notification dialog of FIG. 6B on the screen, and can correctly prompt the user to execute resupply operation. After transmitting print commands for lower surfaces, the data communication processing unit 133 interrupts transmission again and displays the notification dialog of FIG. 6A on the screen. By repeating this transmission process, manual-feed manual duplex printing can be achieved while operation errors by the user are reduced.

As described above, according to the first embodiment, the printer driver 130 changes print page order control in accordance with the paper type designated by the print setting in manual duplex printing even when the user designates copy setting, sort setting, and reverse printing, and a plurality of sheet supply ports are available. Optimal page order control can be performed in accordance with the paper type, and the user can attain a preferable print result without designating a printing method of manual duplex printing at the start of printing.

Second Embodiment

A description of the second embodiment that is common to that of the first embodiment will be omitted, and only features of the second embodiment will be described. The second embodiment is different from the first embodiment in that the user can designate whether manual duplex printing is normal manual duplex printing or manual-feed manual duplex printing in print setting.

<Print Setting Window>

An example of a print setting window (print setting dialog) displayed when a printing mode is set or various paper settings are made according to the second embodiment will be explained with reference to FIG. 12.

Figure 12:
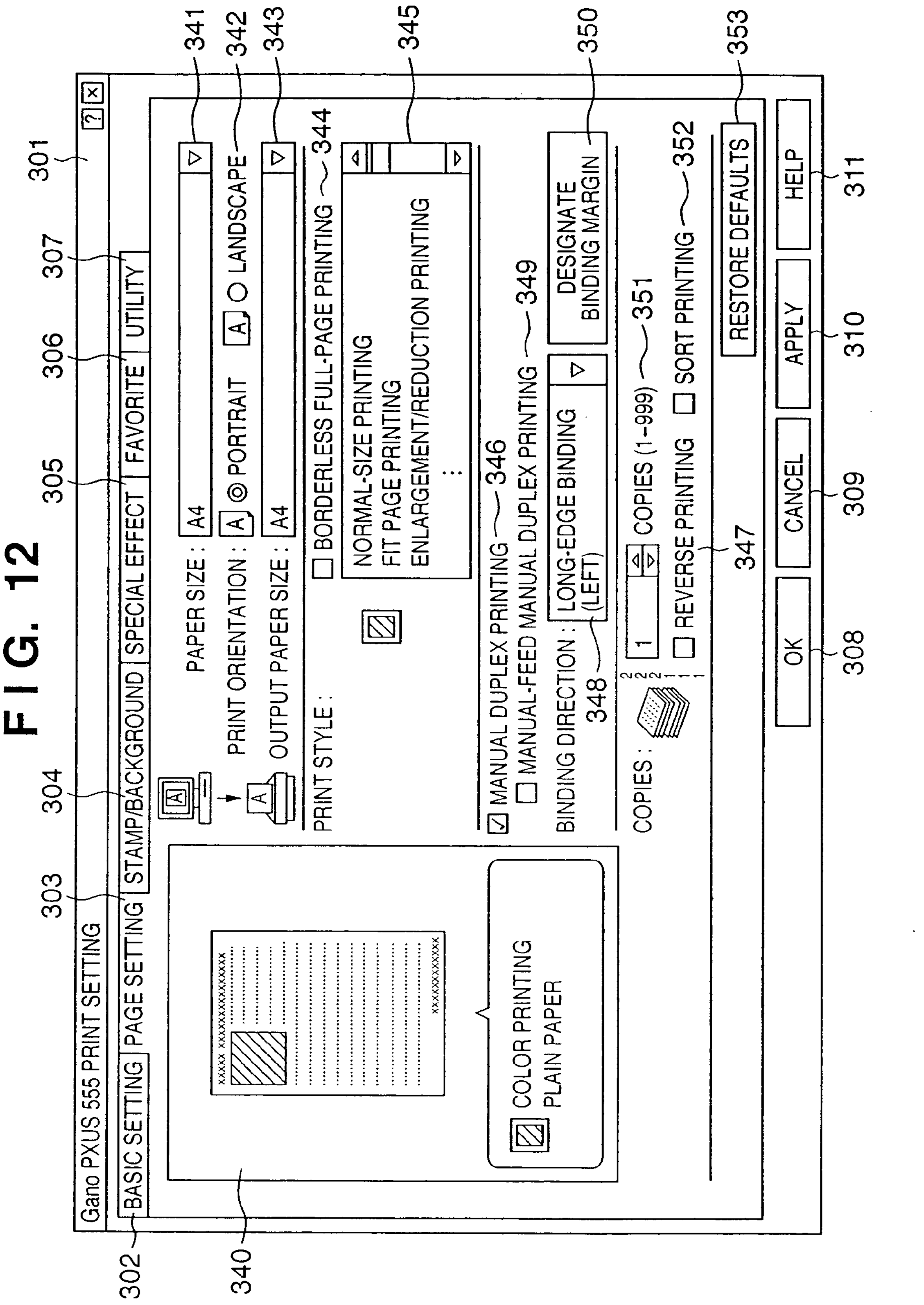
FIG. 12 is a view showing an example of a print setting dialog according to the second embodiment of the present invention.

FIG. 12 is a view showing an example of the print setting dialog according to the second embodiment of the present invention.

In FIG. 12, when the check box of a manual duplex printing selection field 346 is checked (ON) on the print setting dialog of FIG. 4B according to the first embodiment, a manual-feed manual duplex printing selection field 349 is displayed. The manual-feed manual duplex printing selection field 349 is a check box capable of selecting whether to perform manual-feed manual duplex printing, and allows the user to designate a printing method in manual duplex printing.

When the manual duplex printing selection field 346 is OFF (not checked), the manual-feed manual duplex printing selection field 349 is grayed out and cannot be selected. That is, operation to the manual-feed manual duplex printing selection field is inhibited. With this setting, the user can select manual-feed manual duplex printing only when manual duplex printing is designated.

Further, when a paper type which requires manual-feed manual duplex printing is set in a paper type selection field 322 of a basic setting tab 302 in FIG. 4A, the manual duplex printing selection field 346 may be grayed out, and only when a paper type which does not require manual-feed manual duplex printing is set, the user may be allowed to select the manual duplex printing selection field 346.

<Print Order Control on Upper and Lower Surfaces by Printer Driver>

Print order control on upper and lower surfaces by a printer driver will be described with reference to FIG. 13.

Figure 13:
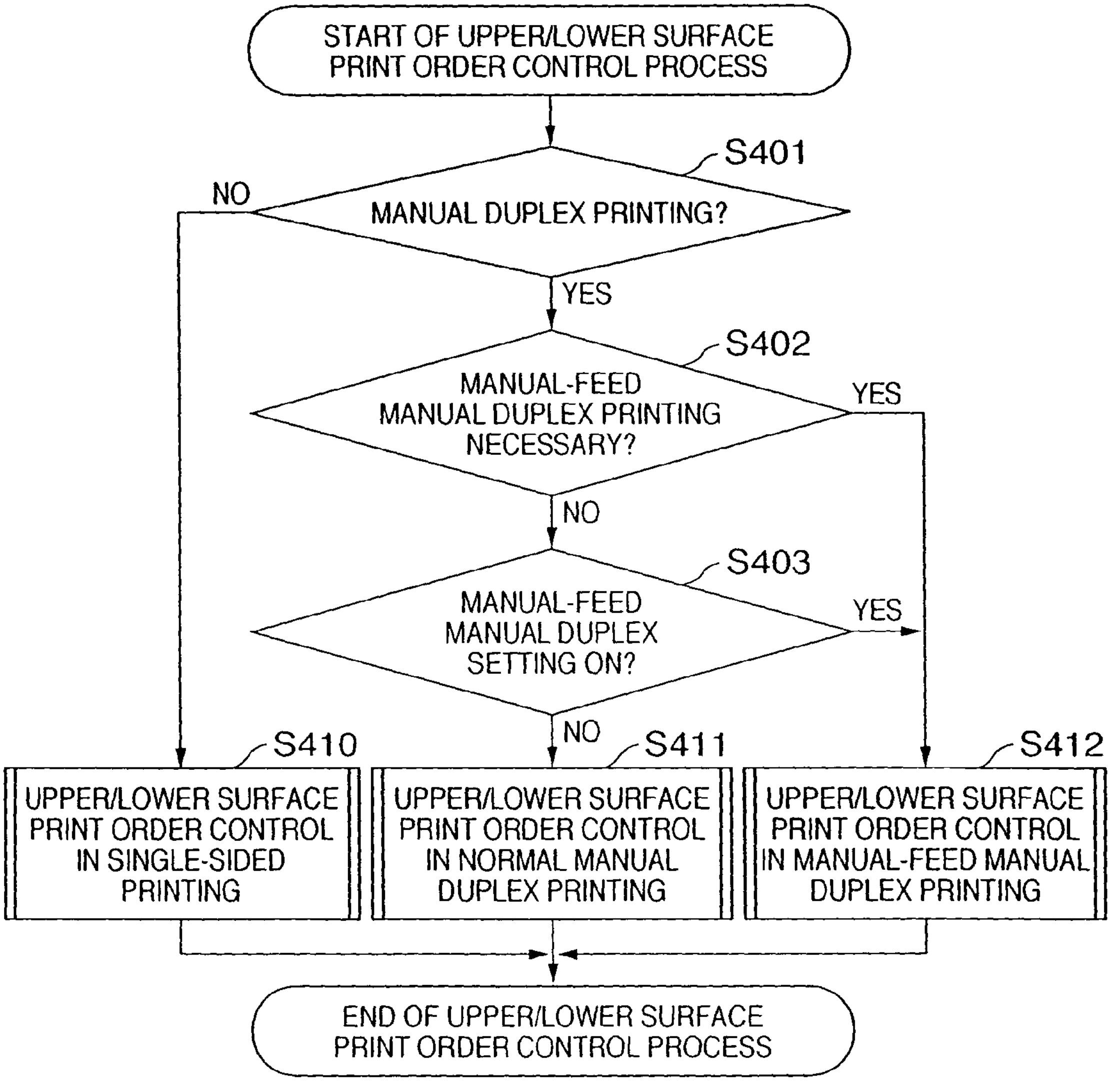
FIG. 13 is a flowchart showing an upper/lower surface print order control process executed by the print page order control unit of a printer driver in printing according to the second embodiment of the present invention.

FIG. 13 is a flowchart showing an upper/lower surface print order control process executed by the print page order control unit of the printer driver in printing according to the second embodiment of the present invention.

Steps common to those in FIG. 8 of the first embodiment are assigned the same step numbers, and a detailed description thereof will be omitted.

If manual-feed manual duplex printing is not necessary in step S402 (NO in step S402), the flow advances to step S403 to determine whether manual-feed manual duplex printing is designated by the print setting. If manual-feed manual duplex printing is set (YES in step S403), the flow advances to step S412 to execute upper/lower surface print order control in manual-feed manual duplex printing. If no manual-feed manual duplex printing is designated (NO in step S403), the flow advances to step S411 to execute upper/lower surface print order control in normal manual duplex printing.

In this manner, a printer driver 130 automatically determines and controls the printing method of manual duplex printing in accordance with the paper type set in printing, and the user can select the printing method of manual duplex printing. When a paper type which requires manual-feed manual duplex printing is selected, the printer driver 130 automatically performs manual-feed manual duplex printing. Even when a paper type which does not require manual-feed manual duplex printing is adopted, the user can designate manual-feed manual duplex printing, obtaining a high-quality result of manual duplex printing.

As described above, according to the second embodiment, the printer driver 130 automatically executes manual-feed manual duplex printing when a paper type which requires manual-feed manual duplex printing is designated by the print setting in manual duplex printing even while the user designates copy setting, sort setting, and reverse printing, and a plurality of sheet supply ports are available. Even if a paper type which does not require manual-feed manual duplex printing is designated by the print setting, the user can designate manual-feed manual duplex printing. The second embodiment can provide more flexible print settings than those in the first embodiment, and the user can attain a high-quality result of manual duplex printing in accordance with user's preferences.

Modification to Embodiments

The present invention is not limited to the above embodiments, and can be variously modified. Modifications are as follows.

The above embodiments assume a personal computer when a data processing apparatus as one of components of the printing system is described as a feature of the present invention, but the data processing apparatus does not have a function unique to a personal computer. In other words, the type of data processing apparatus does not matter as far as the apparatus comprises a function of setting the number of copies to be printed and an item subjected to sort printing. The present invention does not limit devices and apparatuses as far as they implement the total functions of the printing system.

The embodiments of the present invention employ Microsoft Windows® XP as an OS, but the present invention is not limited to this OS and can be implemented by an arbitrary OS by adopting the same arrangement.

The embodiments of the present invention use a USB interface as an interface between the data processing apparatus 102 and the printer 101, but the present invention is not limited to this interface and can be implemented by an arbitrary interface by adopting the same arrangement.

As has been described above, the embodiments of the present invention can achieve the following effects.

(1) The user only designates a paper type for use, and the printer driver can execute optimal page order control in manual duplex printing.

(2) Even when a paper type which does not require page order control in manual-feed manual duplex printing is used, the user can designate manual-feed manual duplex printing in accordance with his intention to obtain a high-quality print result.

(3) Only when a paper type which does not require page order control in manual-feed manual duplex printing is selected, the user can operate manual-feed manual duplex printing, and operation errors of print settings by the user can be eliminated.

(4) When page order control in manual-feed manual duplex printing is performed, a notification which prompts the user of operation is issued at a timing before the start of printing on an upper surface and that of printing on a lower surface, thus reducing operation errors of printing paper by the user.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-194291 filed on Jun. 30, 2004, the entire contents of which are hereby incorporated by reference herein.

What is claimed is:

1. A data processing apparatus which generates a print command associated with printing and outputs the print command to a printing apparatus, comprising:

a setting unit adapted to execute print setting by using, as print setting items associated with printing, a setting item on a paper type of a printing paper sheet used for printing and a setting item which designates whether to execute manual duplex printing;

an execution unit adapted to determine whether the execution of manual duplex printing is set, and to determine whether a paper type set by said setting unit is double-sided glossy paper when it is determined that the execution of manual duplex printing is set, wherein, when it is determined that the paper type set by said setting unit is not double-sided glossy paper, the execution unit executes normal manual duplex printing for causing the printing apparatus to print on all upper surfaces of printing paper sheets, display a notification window which prompts a user to turn over and set the printing paper sheets having undergone printing on their upper surfaces to the printing apparatus, and then causes the printing apparatus to print all lower surfaces of the printing paper sheets set by a user, and wherein, when it is determined that the paper type set by said setting unit is double-sided glossy paper, the execution unit executes for all printing paper sheets, manual feed manual duplex printing for causing the printing apparatus to print an upper surface of one printing paper sheet, display a notification window which prompts a user to, if another printing paper sheet has already been set at a feeder, remove it, and to turn over and set the printing paper sheet having undergone printing on the upper surface at the feeder, and then causes the printing apparatus to print a lower surface of the printing paper sheet set by the user.

2. The apparatus according to claim 1, wherein said printing paper sheet printed by said manual feed manual duplex printing includes a paper sheet on which a visible image on the printed surface suffers density nonuniformity or color staining due to a stack of delivered paper sheets.

3. The apparatus according to claim 1, wherein said setting unit further has, as the setting item, a setting item which designates whether to execute manual feed manual duplex printing, and said setting unit inhibits setting of the setting item which designates whether to execute manual feed manual duplex printing, on the basis of a setting state of the setting item on manual duplex printing.

4. The apparatus according to claim 1, wherein said setting unit further has, as the setting item, a setting item which designates whether to execute manual feed manual duplex printing, and said setting unit inhibits setting of the setting item which designates whether to execute manual feed manual duplex printing, on the basis of a setting state of the setting item on the paper type.

5. The apparatus according to claim 1, further comprising a notification window output unit adapted to switch and output, on the basis of an output state of the print command generated by said execution unit, a notification window which prompts a user to set a new printing paper sheet at a sheet supply port of the printing apparatus, and a notification window which prompts the user to set a printing paper sheet having undergone printing on an upper surface at the sheet supply port.

6. The apparatus according to claim 1, wherein said setting unit further has, as the setting item, a setting item on print quality, and said execution unit determines whether the paper type set by said setting unit requires the manual feed manual duplex printing by determining whether the paper type is set by said setting unit is a first paper sheet and a print quality set by said setting unit is high quality, when it is determined that the paper type set by said setting unit does not require the manual feed manual duplex printing in case that paper type set by said setting unit is the first paper sheet and the print quality set by setting unit is not high quality, said execution unit executes the normal manual duplex printing, and when it is determined that the paper type set by said setting unit requires the manual feed manual duplex printing in case that the paper types set by said setting unit is the first paper sheet and the print quality set by setting unit is high quality, said execution unit executes the manual feed manual duplex printing.

7. The apparatus according to claim 1, when it is determined that the paper type set by said setting unit is a normal paper sheet and the print quality set by setting unit is quick, said execution unit executes the normal manual duplex printing, and when it is determined that the paper type set by said setting unit is a normal paper sheet and the print quality set by setting unit is fine, said execution unit executes the manual feed manual duplex printing.

8. The apparatus according to claim 1, wherein when it is determined that the paper type set by said setting unit is not double-sided glossy paper, the execution unit executes normal manual duplex printing for causing the printing apparatus to print on all upper surfaces of printing paper sheets, for displaying a notification window which prompts a user to turn over and set the printing paper sheets having undergone printing on their upper surfaces to the printing apparatus without which prompts a user to, if another printing paper sheet has already been set at a feeder, remove it, and to turn over and set the printing paper sheets at the feeder, and then for causing the printing apparatus to print all lower surfaces of the printing paper sheets set by a user, and wherein, when it is determined that the paper type set by said setting unit is double-sided glossy paper, the execution unit executes for all printing paper sheets manual feed manual duplex printing for causing the printing apparatus to print an upper surface of one printing paper sheet, for displaying a notification window which prompts a user to, if another printing paper sheet has already been set at a feeder, remove it, and to turn over and set the printing paper sheet having undergone printing on the upper surface at the feeder, and then for causing the printing apparatus to print a lower surface of the printing paper sheet set by the user.

9. A method of controlling a data processing apparatus which generates a print command associated with printing and outputs the print command to a printing apparatus, comprising:

a setting step of executing print setting by using, as print setting items associated with printing, a setting item on a paper type of printing paper sheet used for printing and a setting item which designates whether to execute manual duplex printing;

an execution step of determining whether the execution of manual duplex printing is set, and determining whether a paper type set in said setting step is double-sided glossy paper when it is determined that the execution of manual duplex printing is set, wherein, when it is determined that the paper type set in said setting step is not double-sided glossy paper, the execution step executes normal manual duplex printing for causing the printing apparatus to print on all upper surfaces of printing paper sheets, display a notification window which prompts a user to turn over and set the printing paper sheets having undergone printing on their upper surfaces to the printing apparatus, and then causes the printing apparatus to print all lower surfaces of the printing paper sheets set by a user, and wherein, when it is determined that the paper type set in said setting step is double-sided glossy paper, the execution step executes for all printing paper sheets manual feed manual duplex printing for causing the printing apparatus to print an upper surface of one printing paper sheet, display a notification window which prompts a user to, if another printing paper sheet has already been set at a feeder, remove it, and to turn over and set the printing paper sheet having undergone printing on the upper surface at the feeder, and then causes the printing apparatus to print a lower surface of the printing paper sheet set by the user.

10. A method, according to claim 9, wherein when it is determined that the paper type set by said setting unit is not double-sided glossy paper, the execution step executes normal manual duplex printing for causing the printing apparatus to print on all upper surfaces of printing paper sheets, for displaying a notification window which prompts a user to turn over and set the printing paper sheets having undergone printing on their upper surfaces to the printing apparatus without which prompts a user to, if another printing paper sheet has already been set at a feeder, remove it, and to turn over and set the printing paper sheets at the feeder, and then for causing the printing apparatus to print all lower surfaces of the printing paper sheets set by a user, and wherein, when it is determined that the paper type set by said setting step is double-sided glossy paper, the execution step executes for all printing paper sheets manual feed manual duplex printing for causing the printing apparatus to print an upper surface of one printing paper sheet, for displaying a notification window which prompts a user to, if another printing paper sheet has already been set at a feeder, remove it, and to turn over and set the printing paper sheet having undergone printing on the upper surface at the feeder, and then for causing the printing apparatus to print a lower surface of the printing paper sheet set by the user.

11. A non-transitory computer-readable storage medium storing a computer-executable program on a computer-readable medium, for implementing control of a data processing apparatus which generates a print command associated with printing and outputs the print command to a printing apparatus, comprising:

a program code for a setting step of executing print setting by using, as print setting items associated with printing, a setting item on a paper type of printing paper sheet used for printing and a setting item which designates whether to execute manual duplex printing;

a program code for an execution step of determining whether the execution of manual duplex printing is set, and determining whether a paper type set in said setting step is double-sided glossy paper when it is determined that the execution of manual duplex printing is set, wherein, when it is determined that the paper type set in said setting step is not double-sided glossy paper, the execution step executes normal manual duplex printing for causing the printing apparatus to print on all upper surfaces of printing paper sheets, display a notification window which prompts a user to turn over and set the printing paper sheets having undergone printing on their upper surfaces to the printing apparatus, and then causes the printing apparatus to print all lower surfaces of the printing paper sheets, set by a user, and wherein, when it is determined that the paper type set in said setting step is double-sided glossy paper, the program step executes for all printing paper sheets manual feed manual duplex printing for causing the printing apparatus to print an upper surface of one printing paper sheet, display a notification window which prompts a user to, if another printing paper sheet has already been set at a feeder, remove it, and to turn over and set the printing paper sheet having undergone printing on the upper surface at the feeder, and then causes the printing apparatus to print a lower surface of the printing paper sheet set by the user.

12. The non-transitory computer-readable storage medium storing a computer-executable program according to claim 11, wherein said printing paper sheet printed by the normal manual duplex printing is a paper sheet other than the double-sided glossy paper, and wherein, said printing paper sheet printed by the manual feed manual duplex printing is double-sided glossy paper.

13. A non-transitory computer-readable storage medium, according to claim 11, wherein when it is determined that the paper type set by said setting step is not double-sided glossy paper, the execution step executes normal manual duplex printing for causing the printing apparatus to print on all upper surfaces of printing paper sheets, for displaying a notification window which prompts a user to turn over and set the printing paper sheets having undergone printing on their upper surfaces to the printing apparatus without which prompts a user to, if another printing paper sheet has already been set at a feeder, remove it, and to turn over and set the printing paper sheets at the feeder, and then for causing the printing apparatus to print all lower surfaces of the printing paper sheets set by a user, and wherein, when it is determined that the paper type set by said setting step is double-sided glossy paper, the execution step executes for all printing paper sheets manual feed manual duplex printing for causing the printing apparatus to print an upper surface of one printing paper sheet, for displaying a notification window which prompts a user to, if another printing paper sheet has already been set at a feeder, remove it, and to turn over and set the printing paper sheet having undergone printing on the upper surface at the feeder, and then for causing the printing apparatus to print a lower surface of the printing paper sheet set by the user.

* * * * *